United States Patent
Pacala

(10) Patent No.: US 11,695,911 B2
(45) Date of Patent: Jul. 4, 2023

(54) STEREOSCOPIC IMAGE CAPTURING SYSTEMS

(71) Applicant: Ouster, Inc., San Francisco, CA (US)

(72) Inventor: Angus Pacala, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 7 days.

(21) Appl. No.: 17/229,671

(22) Filed: Apr. 13, 2021

(65) Prior Publication Data

US 2021/0337178 A1    Oct. 28, 2021

Related U.S. Application Data

(60) Provisional application No. 63/016,118, filed on Apr. 27, 2020.

(51) Int. Cl.
*H04N 13/25* (2018.01)
*G01S 17/894* (2020.01)
*G01S 17/86* (2020.01)
(Continued)

(52) U.S. Cl.
CPC ............. *H04N 13/25* (2018.05); *G01S 17/10* (2013.01); *G01S 17/86* (2020.01); *G01S 17/894* (2020.01);
(Continued)

(58) Field of Classification Search
CPC .......... G01S 17/10; G01S 17/86; G01S 17/89; G01S 17/894; H04N 13/221;
(Continued)

(56) References Cited

U.S. PATENT DOCUMENTS 9,989,406 B2  6/2018  Pacala et al.
9,992,477 B2  6/2018  Pacala et al.
(Continued)

OTHER PUBLICATIONS

Application No. PCT/US2021/028488, International Search Report and Written Opinion, dated Jul. 26, 2021, 11 pages.
PCT/US2021/028488, "International Preliminary Report on Patentability", dated Nov. 10, 2022, 10 pages.

*Primary Examiner* — Farzana Hossain
(74) *Attorney, Agent, or Firm* — Kilpatrick Townsend & Stockton LLP

(57) ABSTRACT

A stereoscopic imager system, comprising: a sensor array comprising a first plurality of photosensors and a second plurality of photosensors spaced apart from the first plurality of photosensors by a gap, the first plurality of photosensors and the second plurality of photosensors being configured to detect ambient light in a scene; a moving component coupled to the sensor array and operable to move the sensor array between a first position and a second position within a full rotational image capturing cycle; and a system controller coupled to the sensor array and the moving component. The system controller can be configured to: move a field of view of a sensor array by instructing the moving component to capture a first image of an object in the scene with the first plurality of photosensors from a first perspective at the first position, and to capture a second image of the scene of the object in the scene with the second plurality of photosensors from a second perspective at the second position; and calculate, based on the first image and the second image, a distance to the object using an optical baseline defined by the gap.

20 Claims, 12 Drawing Sheets

(51) Int. Cl.
*G01S 17/10* (2020.01)
*H04N 13/243* (2018.01)
*H04N 13/296* (2018.01)
*H04N 13/254* (2018.01)
*H04N 23/58* (2023.01)
*H04N 13/00* (2018.01)

(52) U.S. Cl.
CPC ......... *H04N 13/243* (2018.05); *H04N 13/254* (2018.05); *H04N 13/296* (2018.05); *H04N 23/58* (2023.01); *H04N 2013/0081* (2013.01)

(58) Field of Classification Search
CPC .... H04N 13/239; H04N 13/243; H04N 13/25; H04N 13/254; H04N 13/296; H04N 2013/0081; H04N 5/2259; H04N 23/58
See application file for complete search history.

(56) References Cited

U.S. PATENT DOCUMENTS

| | | |
|---|---|---|
| 10,222,475 B2 | 3/2019 | Pacala et al. |
| 10,444,359 B2 | 10/2019 | Pacala et al. |
| 10,739,189 B2 | 8/2020 | Pacala et al. |
| 10,809,380 B2 | 10/2020 | Pacala |
| 10,884,126 B2 | 1/2021 | Shu et al. |
| 10,948,572 B2 | 3/2021 | Pacala et al. |
| 2006/0072020 A1 | 4/2006 | Mccutchen |
| 2016/0239978 A1 | 8/2016 | Cole et al. |
| 2017/0353710 A1 | 12/2017 | Sasaki et al. |
| 2019/0011567 A1* | 1/2019 | Pacala ............... H01L 31/02027 |
| 2019/0056497 A1* | 2/2019 | Pacala ................... G01S 7/4863 |
| 2020/0116560 A1 | 4/2020 | Pacala et al. |

* cited by examiner

FIG. 3A  FIG. 3B

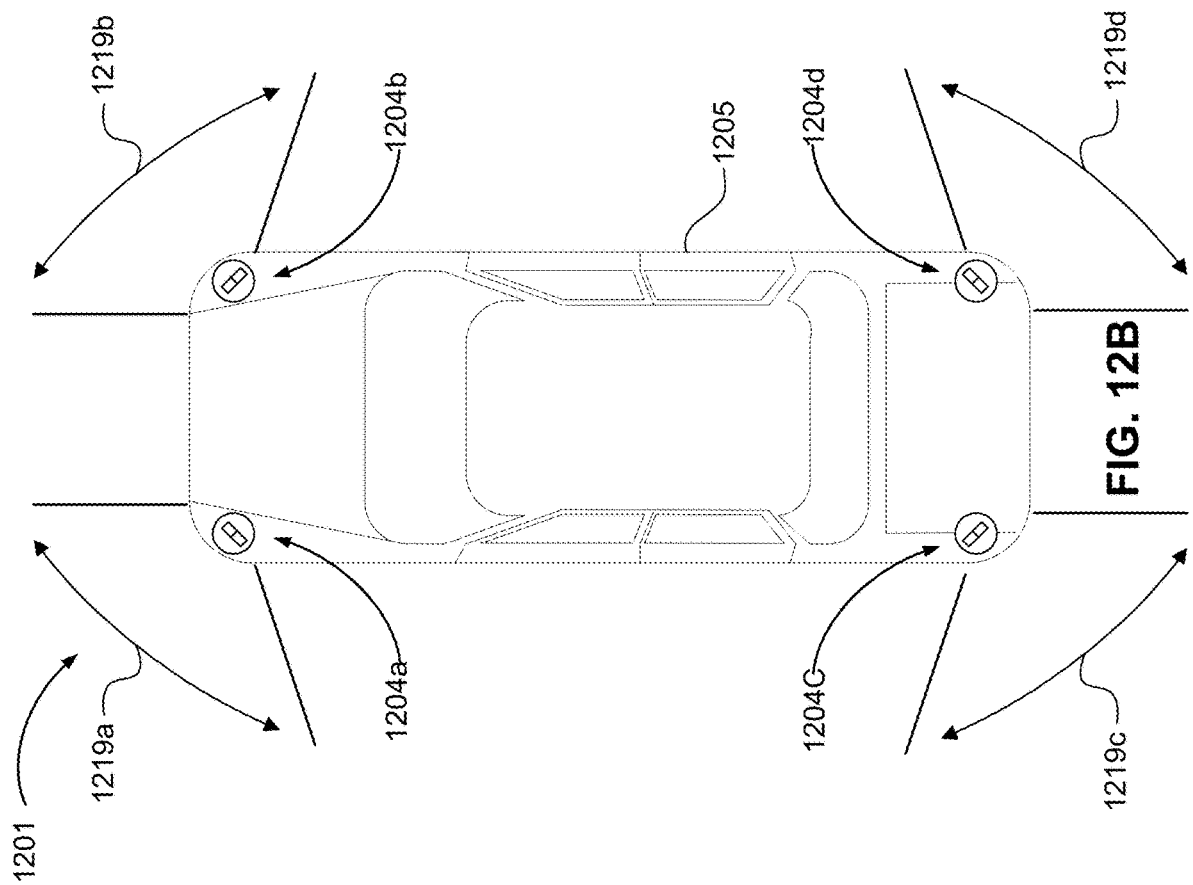
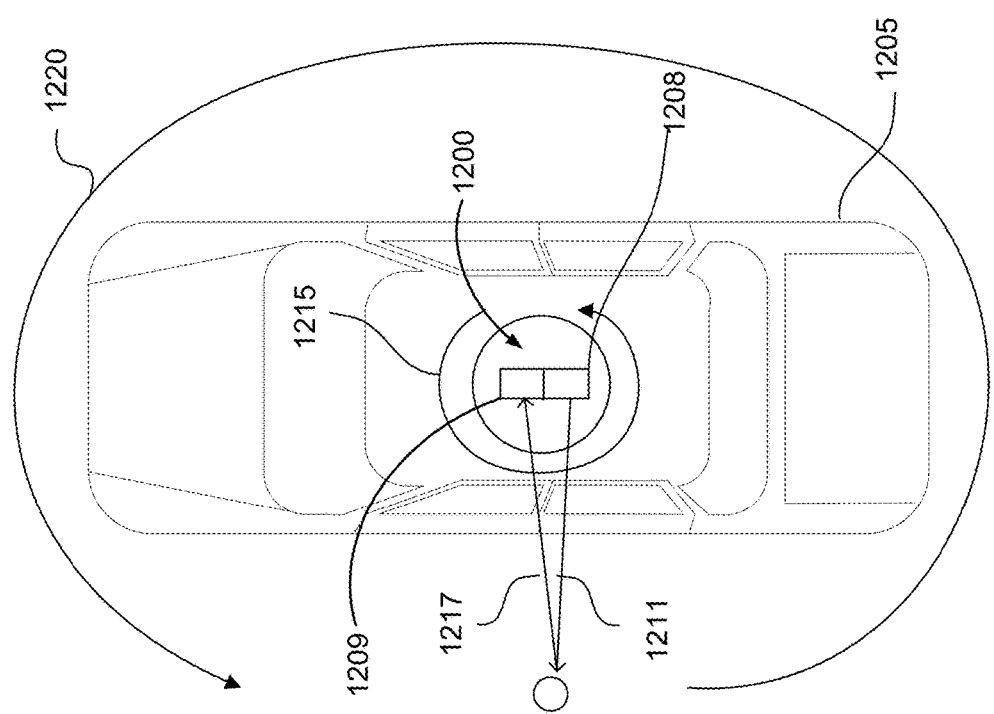
FIG. 12A
FIG. 12B

STEREOSCOPIC IMAGE CAPTURING SYSTEMS

CROSS-REFERENCES TO RELATED APPLICATIONS

This application claims the benefit of U.S. Provisional Application No. 63/016,118, filed Apr. 27, 2020, which is incorporated by reference herein.

BACKGROUND

Image capturing systems capture images of a scene by sensing light. The light is typically sensed by an image sensor, such as a charge-coupled device (CCD) or a complementary metal-oxide semiconductor (CMOS) device, that can convert sensed light into electrons. The electrons can then be read and interpreted to construct the captured image. The image captured by the image sensor often does not provide a perception of depth for constructing a stereoscopic image of the scene, nor does it enable the calculation of distance to objects in the scene.

SUMMARY

Some embodiments of the disclosure pertain to stereoscopic image capturing systems that can capture depth information with a sensor array. A stereoscopic image capturing system can be configured to move its sensor array, e.g., by rotating the array about an axis transverse to its rows, so that a given location in space can be successively imaged by at least two photosensors that are spaced apart from one another. The distance between the two photosensors can be used as an optical baseline for calculating depth information to the given location in the field, thereby enabling the stereoscopic image capturing system to not only construct images with a perception of depth from a 2D sensor array, but also to determine depth information to augment ranging accuracy of depth sensors.

Some embodiments pertain to a stereoscopic image capturing system that includes both ranging and imaging photosensors. The stereoscopic imager system can include: a sensor array comprising: a plurality of ranging photosensors that detect light emitted from an emitter array once it has reflected off of an object in a scene; a first plurality of imaging photosensors positioned at a first side of the ranging photosensors; and a second plurality of imaging photosensors positioned at a second side of the ranging photosensors opposite from the first side. The first plurality of imaging photosensors and the second plurality of imaging photosensors can detect ambient light in the scene and can be spaced apart by a gap. The system can further include a moving component coupled to the sensor array and operable to move the sensor array between a first position and a second position within a full rotational image capturing cycle; and a system controller coupled to the sensor array and the moving component. The system controller can be configured to: determine a first distance to an object in the scene using the plurality of ranging photosensors by way of time-of-flight calculations; capture a first image of the scene at the first position with the first plurality of imaging photosensors and a second image of the scene at the second position with the second plurality of imaging photosensors; and calculate a second distance to the object based on the first image and the second image and an optical baseline determined by the gap.

In some implementations, embodiments can include one or more of the following features. The plurality of ranging photosensors can be organized in a diagonally staggered arrangement. The first and second pluralities of imaging photosensors can each be organized in rectangular arrangements. At least some of the first plurality of imaging photosensors and at least some of the plurality of second imaging photosensors can be positioned along the same horizontal line. The moving component can be an electric motor that rotates the sensor array around a center axis. The moving component can be a micro-electrical mechanical system (MEMS) device that reflects light to move the field of view. The system controller can be further configured to calculate a final distance to the object based on the first distance and the second distance.

According to some embodiments, a stereoscopic imager system includes: a sensor array comprising a first plurality of photosensors and a second plurality of photosensors spaced apart from the first plurality of photosensors by a gap, the first plurality of photosensors and the second plurality of photosensors being configured to detect ambient light in a scene; a moving component coupled to the sensor array and operable to move the sensor array between a first position and a second position within a full rotational image capturing cycle; and a system controller coupled to the sensor array and the moving component. The system controller can be configured to: move a field of view of a sensor array by instructing the moving component to capture a first image of an object in the scene with the first plurality of photosensors from a first perspective at the first position, and to capture a second image of the scene of the object in the scene with the second plurality of photosensors from a second perspective at the second position; and calculate, based on the first image and the second image, a distance to the object using an optical baseline defined by the gap.

In some embodiments a method of distance measurement is provided where the method includes: moving a field of view of a sensor array including a first imaging photosensor and a second imaging photosensor spaced apart from the first imaging photosensor by a gap; capturing a first image of an object in a scene with the first imaging photosensor from a first perspective at a first instance of time as the field of view moves; capturing a second image of the scene of the object in the scene with the second imaging photosensor from a second perspective at a second instance of time as the field of view moves; and calculating, based on the first image and the second image, a first distance to the object using an optical baseline defined by the gap.

In various implementations, the method can include one or more of the following. Moving the field of view can include rotating the sensor array around a center axis. Moving the field of view can include reflecting light to move the field of view while the sensor array is stationary. The first array of imaging photosensors and the second array of imaging photosensors can each be two-dimensional arrays of imaging photosensors. The sensor array can be formed of a two-dimensional array of imaging photosensors, and the first array of imaging photosensors and the second array of imaging photosensors can each be a subset of the two-dimensional array of imaging photosensors. The method can further include comparing shared features of the object captured in the first image and the second image, and using the results from the comparison to calculate the first distance to the object. The method can further include measuring a second distance to the object using a ranging photosensor, and determining a final distance to the object based on the first distance and the second distance. And, the ranging photosensor can be in a two-dimensional array of ranging photosensors and the first and second arrays of imaging photosensors can be located on opposing sides of the array of ranging photosensors.

A better understanding of the nature and advantages of embodiments of the present disclosure may be gained with reference to the following detailed description and the accompanying drawings. It is to be understood, however, that each of the figures is provided for the purpose of illustration only and is not intended as a definition of the limits of the scope of the disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 3A-3B are simplified top-down illustrations of a rotating light detection system during different instances of time of an image capturing sequence, according to some embodiments of the present disclosure.

FIGS. 12A-12B are simple illustrations of example implementations of stereoscopic imager systems, according to some embodiments of the present disclosure.

DETAILED DESCRIPTION

Figure 1:
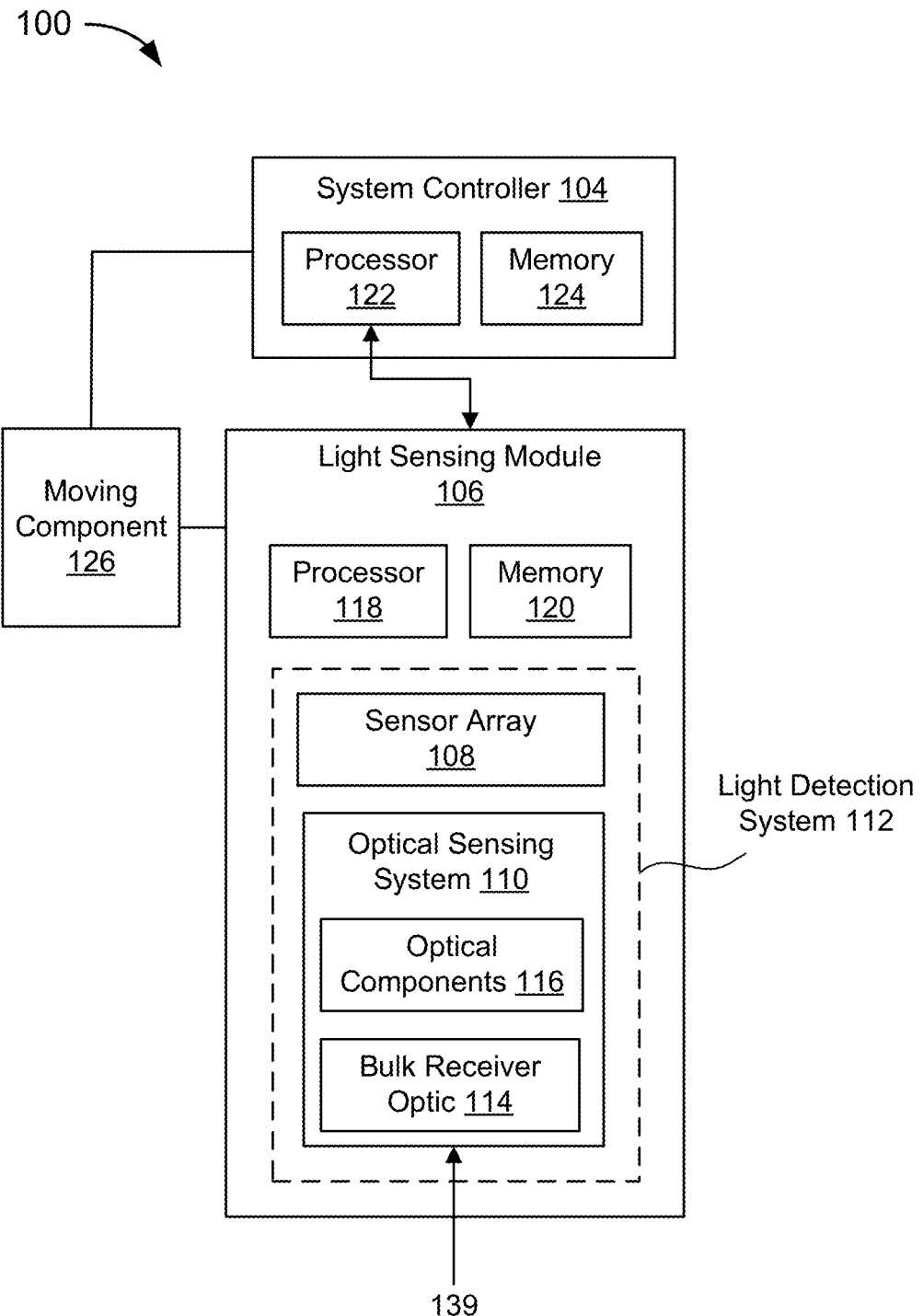
FIG. 1 is a block diagram of an example passive stereoscopic imager system, according to some embodiments of the present disclosure.

Stereo imaging is a technique that creates or enhances the perception of depth using two offset two-dimensional (2D) images of the same field of view. Data generated from stereo imaging, along with a known distance between the sensors that captured the 2D image (i.e., "optical baseline"), can be used to determine distances to locations within the field of view. Imager systems that perform stereo imaging to capture perception of depth and to determine distances are herein referred to as "stereoscopic imager systems".

Some embodiments of the present disclosure pertain to stereoscopic imager systems that have an image sensor whose field of view can be moved/rotated across a scene. The sensor array can include one or more arrays of photosensors, or one or more subsets of photosensors in a single, two-dimensional array. In some instances, the sensor array includes a first array of photosensors spaced apart from a second array of photosensors, where the first and second array of photosensors are configured to capture images of a scene from two different perspectives for stereo imaging purposes. In order to allow the sensor array to capture images from two different perspectives, the viewing direction of each photosensor in the first array of photosensors can intersect the viewing direction of corresponding photosensors in the second array of photosensors, as will be discussed further herein with respect to FIG. 2. That way, when the viewing direction of the first and second arrays of photosensors are moved across the scene, the field of view captured by the first array of photosensors at a first position can overlap with the field of view of the second array of photosensors at a second position after the field of view of the sensor array has moved from the first position to the second position. As an example, the sensor array can be rotatable around an axis so that when the sensor array rotates around the axis, the first and second arrays of photosensors can capture images of the field from two different perspectives at different instances of time to allow calculation of distance to objects in the scene, as will be discussed further herein with respect to FIGS. 3A-3C.

In some embodiments a stereoscopic imager system can be a passive system that does not actively illuminate a scene and instead detects ambient light in the scene reflected off of one or more objects in the scene. A passive stereoscopic imager system can include a light sensing module for receiving ambient light in the field. The light sensing module can include one or more bulk receiver optics, a micro-optic receiver system, and a system controller for operating the light sensing module. The micro-optic receiver system can include one or more micro-optic receiver layers and one or more photosensors that can measure received light, as will be discussed further herein with respect to FIG. 11.

In some alternative embodiments, the stereoscopic imager system can be an active system that can emit light into a field and then detect the emitted light after it has reflected off surfaces of an object in the field. An active stereoscopic imager system can include a light transmission module in addition to a light sensing module, and be configured as a light ranging device. The light transmission module can include a transmitter layer that is composed of an array of individual emitters (e.g., vertical-cavity surface-emitting lasers (VCSELs)) where each emitter can be paired with a corresponding micro-optic receiver channel and corresponding photosensor of a sensor array in the light sensing module, or it can be a uniform illuminator that spreads light evenly across the scene with no specific pairing between individual emitters and receiver channels. In some instances, the light transmission module can include a micro-optic transmitter channel array to enhance light outputted from the array of emitters. During operation, light (e.g., laser pulses) outputted by the array of emitters passes through the micro-optic transmitter channel array and enters a bulk transmitter optic having a large numerical aperture to better capture light from the micro-optic transmitter channel array. The light then exits the bulk transmitter optic and illuminates a plurality of spots at a distant field.

In such active stereoscopic imager systems, the 2D sensor array can include an array of ranging photosensors for receiving light, e.g., narrowband laser light, emitted by the emitter array for calculating distances via time-of-flight measurements and the like, and an array of imaging photosensors for receiving ambient, red-green-blue (RGB) light for stereo imaging purposes, as will be discussed further herein with respect to FIGS. 7 and 8. By using both ranging photosensors and imaging photosensors, ranging accuracy can be augmented using distance data calculated from stereo images captured by the imaging photosensors.

To better understand the function and configuration of passive and active stereoscopic imager systems according to embodiments of the disclosure, each will be discussed in detail herein.

I. Passive Stereoscopic Imager System

FIG. 1 is a block diagram of an example passive stereoscopic imager system 100, according to some embodiments of the present disclosure. Passive stereoscopic imager system 100 can include a system controller 104 and a light sensing module 106. Imaging data can be generated by passive stereoscopic imager system 100 by receiving light existing in a scene in which passive stereoscopic imager system 100 is positioned. The received light can be light that exists naturally in the field, i.e., ambient light, as opposed to light emitted from a transmitter within system 100.

Light sensing module 106 can include a sensor array 108, which can be, e.g., a two-dimensional array of photosensors. Each photosensor can be a CCD, CMOS, or any other suitable sensor for detecting ambient light. Light sensing module 106 includes an optical sensing system 110, which when taken together with sensor array 108 can form a light detection system 112. In some embodiments, optical sensing system 110 can include a bulk receiver optic 114 and optical components 116, such as an aperture layer, a collimating lens layer and an optical filter, that can be combined with sensor array 108 to form an array of micro-optic receiver channels where each micro-optic receiver channel measures light that corresponds to an image pixel in a distinct field of view of the surrounding field in which system 100 is positioned. Further details of various embodiments of micro-optic receiver channels according to the present disclosure are discussed in detail in conjunction with FIG. 11 herein.

A bulk imaging optic as defined herein can be one or more optical surfaces, possibly including multiple lens elements, that have clear apertures greater than one millimeter and that is positioned to receive light projected from, or focus received light on, a micro-optic transmitter/receiver layer. A bulk imaging optic that projects light received from an optical emitter, such as a micro-optic transmitter layer, is sometimes referred to herein as a bulk transmitter optic or as an output bulk imaging optic. A bulk optic layer that focuses light received from a field onto an optical detector, such as a micro-optic receiver layer, is sometimes referred to herein as a bulk receiver optic or as an input bulk imaging optic. An input, image-space telecentric bulk imaging optic allows the system to measure narrowband light uniformly over a wide field-of-view (FOV).

In some embodiments, sensor array 108 of light sensing module 106 is fabricated as part of a monolithic device on a single substrate (using, e.g., CMOS technology) that includes both an array of photosensors, a processor 118, and a memory 120 for signal processing the measured light from the individual photosensors (or groups of photosensors) in the array. The monolithic structure including sensor array 108, processor 118, and memory 120 can be fabricated as a dedicated ASIC. In some embodiments, optical components 116 can also be a part of the monolithic structure in which sensor array 108, processor 118, and memory 120 are a part. In such instances, optical components 116 can be formed, e.g., bonded (non-reversibly) with epoxy, on the ASIC so that it becomes part of the monolithic structure. As mentioned above, processor 118 (e.g., a digital signal processor (DSP), microcontroller, field programmable gate array (FPGA), and the like) and memory 120 (e.g., SRAM) can perform the signal processing. As an example of signal processing, for each photosensor or grouping of photosensors, memory 120 of light sensing module 106 can accumulate detected photons over time, and these detected photons can be used to recreate an image of the field.

In some embodiments, the output from processor 118 is sent to system controller 104 for further processing, e.g., the data can be encoded by one or more encoders of the system controller 104 and then sent as data packets to user interface 115. System controller 104 can be realized in multiple ways including, e.g., by using a programmable logic device such an FPGA, as an ASIC or part of an ASIC, using a processor 122 with memory 124, and some combination of the above. According to some embodiments of the present disclosure, processor 122 can receive stereoscopic images from light sensing module 106 and use them to generate images with a perception of depth as well as to calculate distances to objects in a scene, as will be discussed further herein. System controller 104 can cooperate with a stationary base controller or operate independently of the base controller (via pre-programed instructions) to control light sensing module 106 by sending commands that include start and stop light detection and adjust photodetector parameters. In some embodiments, system controller 104 has one or more wired interfaces or connectors for exchanging data with light sensing module 106. In other embodiments, system controller 104 communicates with light sensing module 106 over a wireless interconnect such as an optical communication link.

According to some embodiments of the present disclosure, passive stereoscopic imager system 100 can also include a moving component 126 coupled to system controller 104 and light sensing module 106. Moving component 126 can be controlled by system controller 104 to move the field of view of sensor array 108. In some instances, movement of sensor array 108 can be achieved by physically moving light sensing module 106 or by redirecting the field of view of light sensing module 106 by way of light reflection. As an example, moving component 126 can be a motor (e.g., an electric motor) that rotates light sensing module 106 around an axis perpendicular to the rows of photosensors in sensory array 108, as will be discussed further herein with respect to FIGS. 4A-4C. Alternatively, moving component 126 can be a light redirecting component, such as a microelectromechanical system (MEMS) device that can be modulated to reflect the light of a two-dimensional array of light emitters in different directions to capture the two offset 2D images of the field. The two offset 2D images can then be used to generate a stereoscopic image of the scene for calculating distance measurements and/or for generating images with a perception of depth.

A. Light Detection System for Performing Stereoscopic Imaging

Figure 2:
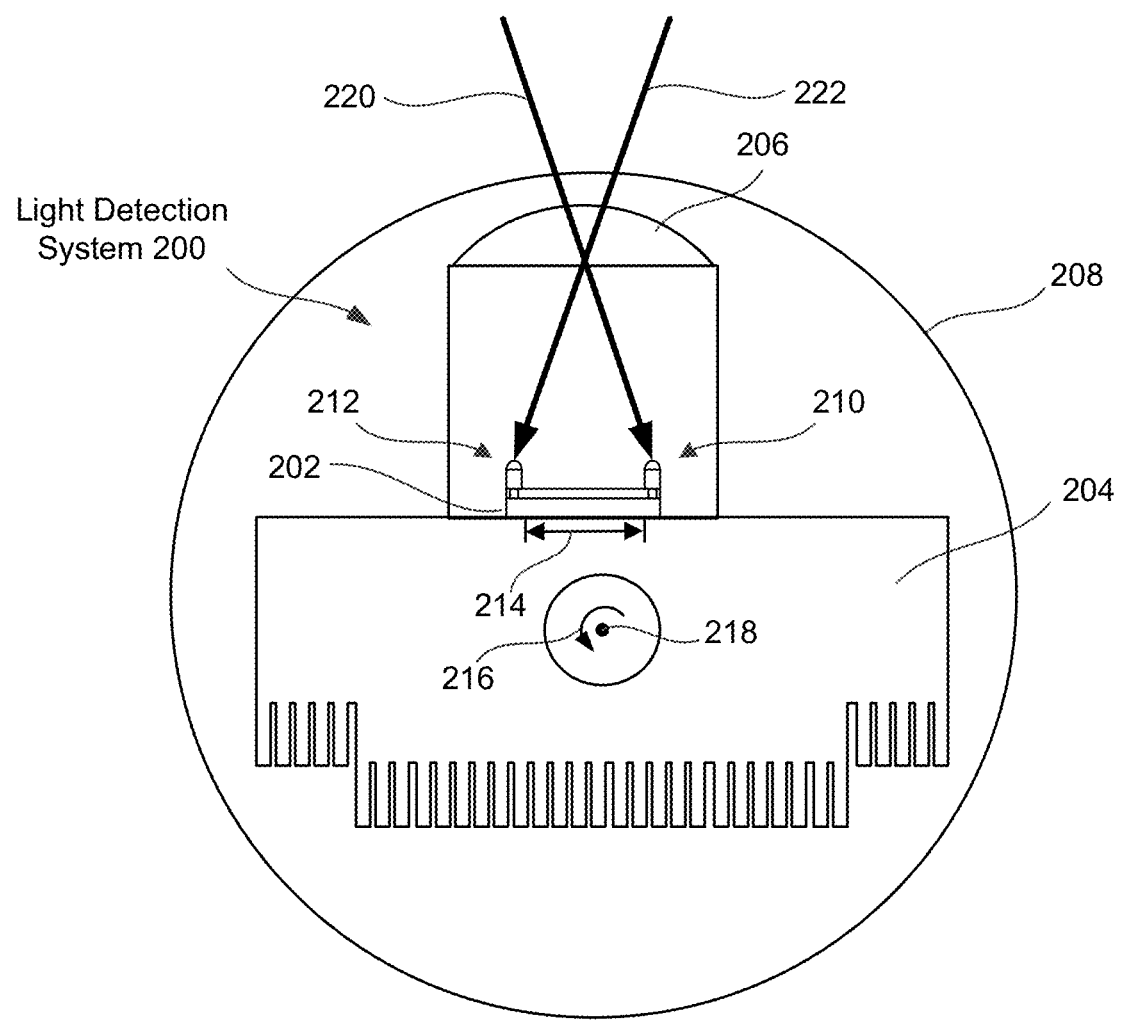
FIG. 2 is a simplified top-down illustration of an example light detection system configured to perform stereoscopic imaging, according to some embodiments of the present disclosure

FIG. 2 is a simplified top-down illustration of an example light detection system 200 configured to perform stereoscopic imaging, according to some embodiments of the present disclosure. Light detection system 200 can include a sensor array 202 mounted on a heat sink 204 for dissipating heat generated by sensor array 202 during operation. Sensor array 202 can be positioned behind a bulk receiver optic 206 so that light propagates through bulk receiver optic 206 before exposing on sensor array 202. Light detection system 200 can be enclosed within an optically transparent housing 208 to protect light detection system 200 from the environment.

In some embodiments, sensor array 202 can include a plurality of photosensors that are arranged to enable capture of two offset 2D images of a scene. For instance, sensor array 202 can include more than one array of photosensors that are spaced apart from one another, or a single array of photosensors with subsets of photosensors that are spaced apart from one another, so that when the field of view of the photosensors is moved, two offset 2D images can be captured. As an example, sensor array 202 can include a first array of photosensors 210 and a second array of photosensors 212 separated by a gap 214. First and second arrays of photosensors 210 and 212 can each be an m×n array of photosensors, and the dimension of the field of views of both first and second arrays of photosensors 210 and 212 can be the same.

In some instances, first and second arrays of photosensors 210 and 212 can capture light from chief rays propagating along different directions. For example, first array of photosensors 210 can capture light from chief rays 220 propagating along a first direction, and second array of photosensors 212 can capture light from chief rays 222 propagating along a second direction, where the first and second directions intersect one another. That way, when the field of view of sensor array 202 is moved, e.g., by physical rotation 216 around a center axis 218, the field of view of first array of photosensors 210 can overlap with the field of view of the second array of photosensors 212 at different instances of time during rotation of light detection system 200, and each array can capture the same image of the scene, but from different perspectives for stereo imaging and distance calculation purposes using gap 214 as an optical baseline. A better understanding of this operation can be understood herein with reference to FIGS. 3A-3C.

Figure 3C:
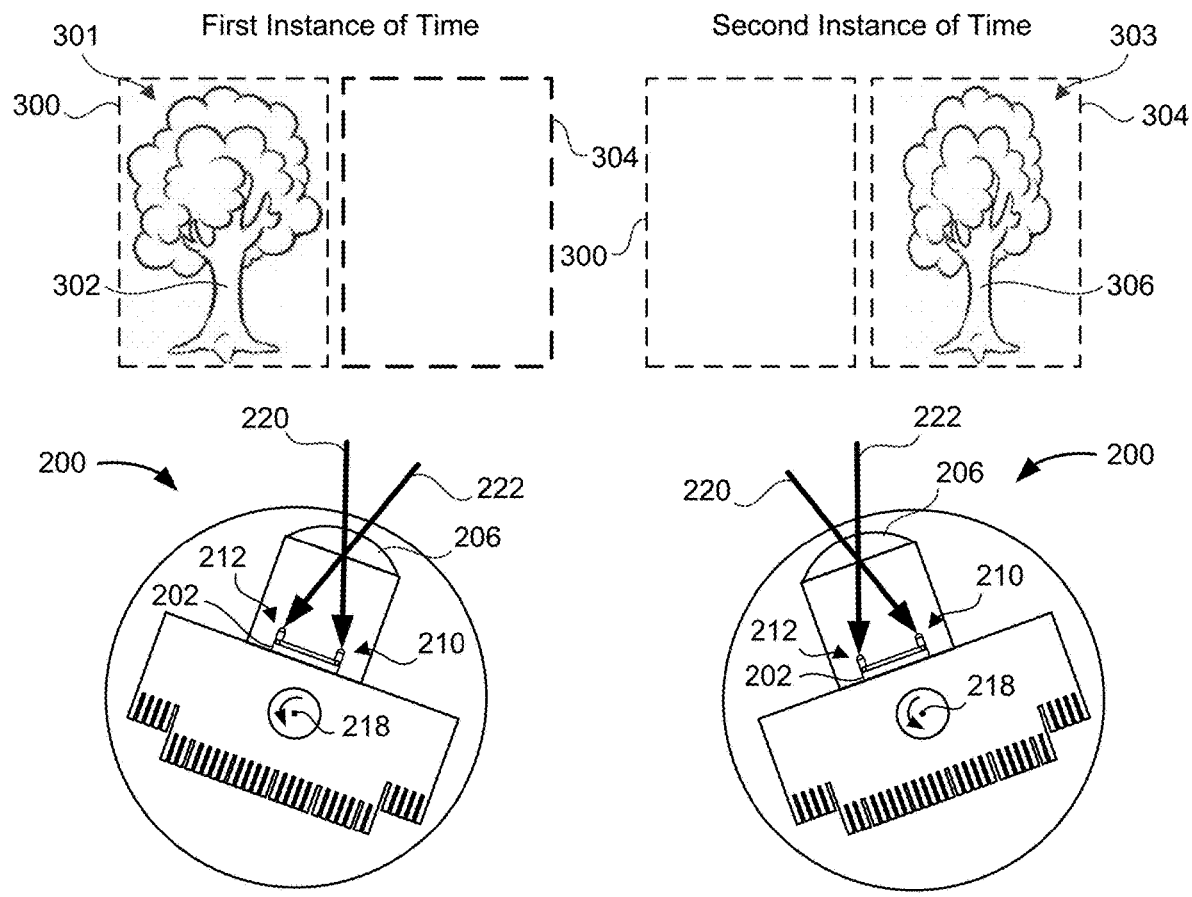
FIG. 3C is a top-down illustration of light detection system during the different instances of time shown in FIGS. 3A-3B superimposed over one another, according to some embodiments of the present disclosure.

FIGS. 3A-3B are simplified top-down illustrations of rotating light detection system 200 during different instances of time of an image capturing sequence, and FIG. 3C is a top-down illustration of light detection system 200 during the different instances of time superimposed over one another, according to some embodiments of the present disclosure. Specifically, FIG. 3A shows light detection system 200 at a first instance of time, and FIG. 3B shows light detection system 200 at a second instance of time after the first instance of time but before light detection system 200 has made a full 360° rotation around its center axis, e.g., center axis 218 in FIG. 3. During operation, light detection system 200 can continuously rotate 360° while its photosensors are activating at a high frequency to capture images of its surroundings, e.g., its scene, for stereoscopic imaging and distance calculation.

As shown in FIG. 3A, light detection system 200 may be positioned as shown in FIG. 3A at the first instance of time while it is rotating around center axis 218. At that time, first array of photosensors 210 of sensor array 202 can be positioned so that its field of view 300 captures an image 301 of a tree 302 from a first perspective via chief rays 220 passing through bulk receiver optic 206. Meanwhile, second array of photosensors 212 can be positioned so that its field of view 304 captures an image of a region to the right of tree 302 via chief rays 222 passing through bulk receiver optic 206.

As light detection system 200 continues to rotate, it may be positioned as shown in FIG. 3B at the second instance of time but before a complete rotation has been made since the position of light detection system 200 at the first instance of time. At the second instance of time, second array of photosensors 212 can be positioned so that its field of view 304 captures an image 303 of tree 302 from a second perspective via chief rays 222 passing through bulk receiver optic 206. Meanwhile, first array of photosensors 210 can be positioned so that its field of view 300 captures an image of a region to the left of tree 302 via chief rays 220 passing through bulk receiver optic 206. The second perspective can be different from the first perspective so that image 301 and image 303 form a pair of offset images of tree 302.

In some embodiments, field of view 300 of first array of photosensors 210 has the same dimension as the field of view 304 of second array of photosensors 212. In such embodiments, the size and shape of first array of photosensors 210 can be equal to the size and shape of second array of photosensors 212. For instance, first and second array of photosensors 210 and 212 can be an m×n array of photosensors of a certain pitch that is suitable for capturing an image of tree 302 in the scene. Thus, the field of view of second array of photosensors 212 at the second instance of time can completely overlap the field of view of first array of photosensors 210 at the first instance of time. Accordingly, image 301 of tree 302 captured by first array of photosensors 210 at the first instance of time and image 303 of tree 302 captured by second array of photosensors 212 at the second instance of time can be images of the same field of view of the scene but from two different perspectives. This pairing of images at different fields of view can be continuously repeated as light detection system 200 continuously rotates around its center axis to capture images of its surrounding scene.

Figure 3C:
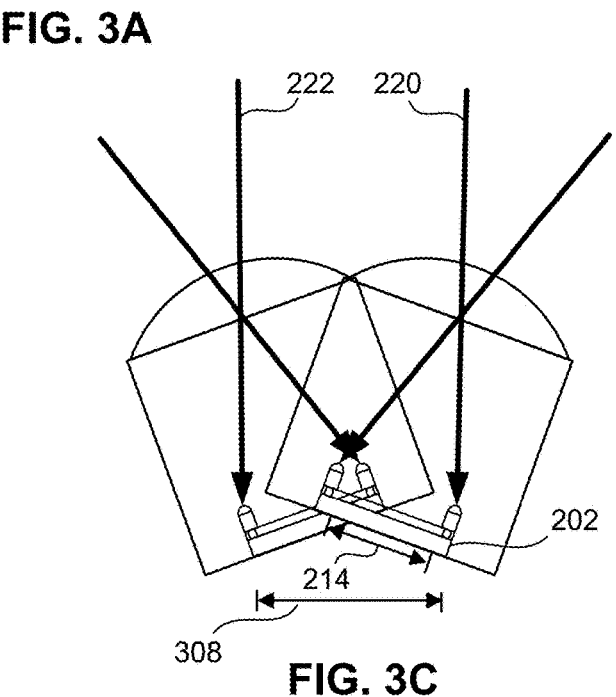

The difference in perspective can be achieved by the relative positioning of first and second arrays of photosensors 210 and 212 as tree 302 at which images 301 and 303 are captured. As shown in FIG. 3C, the position at which first array of photosensors 210 captures image 301 of tree 302 is offset from the position at which second array of photosensors 212 captures image 303 of tree 302 by a distance 308 defined by gap 214. Distance 308 is therefore an optical baseline that can be used to triangulate the distances of the surface of tree 302 from light detection system 200 and for depth perception purposes. As can be appreciated with reference to FIG. 3C, distance 308 can be greater than gap 214 due to the fact that the axis of rotation, e.g., center axis 218 in FIGS. 3 and 3A-3B, is not positioned at the center of sensor array 202, but rather at a position below sensor array 202. Thus, in the embodiment shown in FIGS. 3A-3C, distance 308 is defined by 214 but is not equal to it. This is not intended to be limiting, however, because other embodiments can have the axis of rotation be positioned at the center of sensor array 202 where the optical baseline is equal to the gap between the arrays of photosensors.

As can be appreciated from the discussion above, the two images captured by first array of photosensors 210 at the first instance of time and second array of photosensors 212 at the second instance of time can be images of the same field of view of the scene but from two different perspectives and thus form two offset images suitable for stereoscopic imaging and distance calculation purposes. Distances can be calculated by comparing the two images and measuring a separation distance between the same features of objects evident in the two images. An example of such a comparison is discussed herein with respect to FIG. 5.

Figure 4:
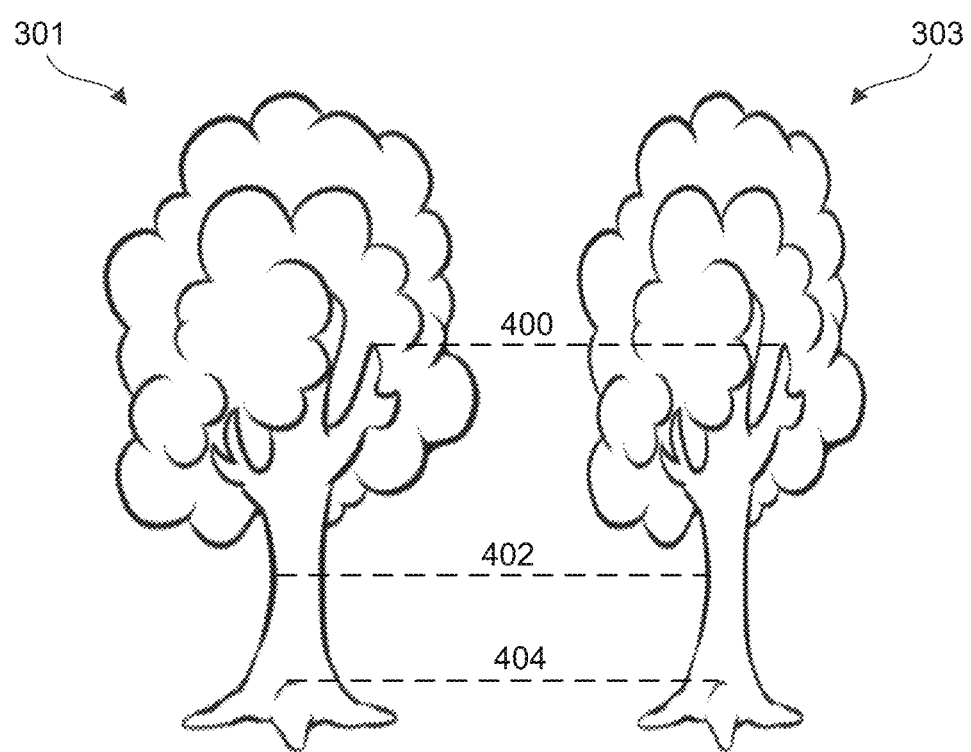
FIG. 4 is a simplified illustration of an example of two offset images captured by first and second arrays of photosensors at first and second instances of time, respectively, according to some embodiments of the present disclosure.

FIG. 4 is a simplified illustration of the two offset images 301 and 303 captured by first and second arrays of photosensors 210 and 212 at the first and second instances of time, respectively, according to some embodiments of the present disclosure. Given the difference in perspectives, image 301 captured by first array of photosensors 210 at the first instance of time can show tree 302 differently than image 303 captured by second array of photosensors 212 at the second instance of time. For instance, tree 302 can appear to be laterally condensed in image 303. With the two images 301 and 303 superimposed over one another (as opposed to being pictured beside one another as shown in FIG. 4 for clarity), distances between the same features of objects in the images, such as distances 400, 402, and 404 between the same branch, trunk, and root, respectively, can be used for triangulation purposes.

It is to be appreciated that rotational movement of light detection system 200 shown in FIGS. 3A-3C is merely one way to move the field of view of light detection system 200, and that embodiments are not intended to be so limited. Other types of mechanisms for moving the field of view to enable stereoscopic imaging are envisioned herein. For instance, a movable mirror, such as a rotating mirror/MEMS device can be used to reflect the chief rays captured by the photosensors of the sensor array so that the photosensors can capture two offset images of the scene as discussed herein.

B. Sensor Array for Passive Stereoscopic Imaging

As aforementioned herein, a sensor array for enabling stereoscopic imaging can include photosensors that are spaced apart from one another so that when the field of view of the sensor array is moved, two offset 2D images can be captured. According to some embodiments, such a sensor array can be constructed various ways. For example, a sensor array can include more than one array of photosensors that are spaced apart from one another, or a sensor array can include a single array of photosensors with subsets of photosensors that are spaced apart from one another, as will be discussed further herein with respect to FIGS. 5A-5C.

Figure 5A:
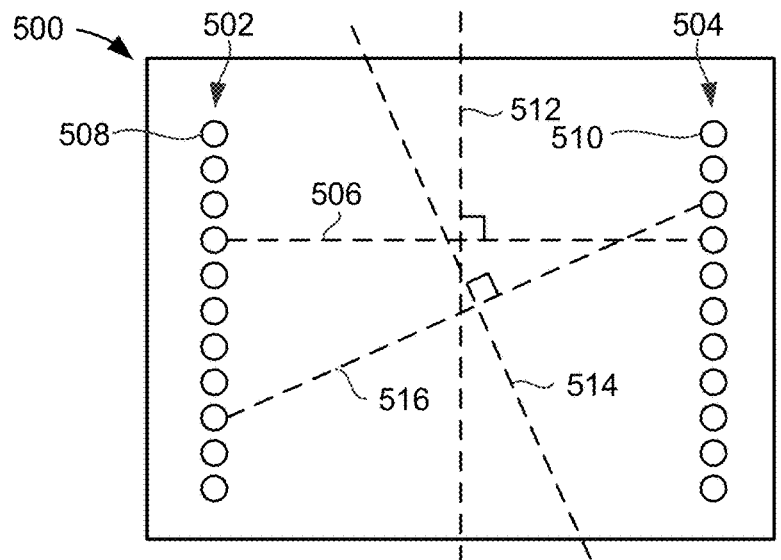
FIG. 5A is a simplified illustration of an example sensor array configured as two separate linear arrays of photosensors that are spaced apart from one another for performing stereoscopic imaging, according to some embodiments of the present disclosure.
Figure 5B:
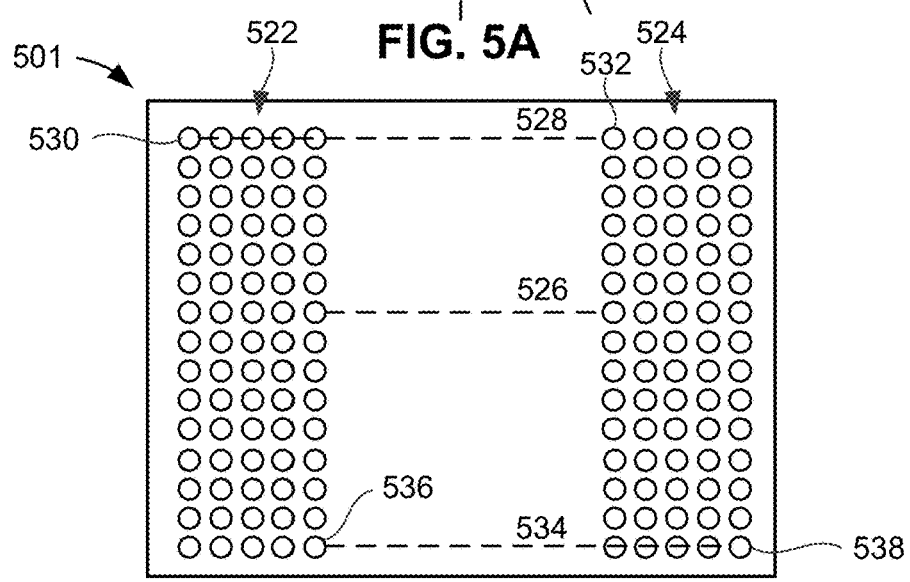
FIG. 5B is a simplified illustration of an example sensor array configured as two separate m×n arrays of photosensors that are spaced apart from one another for performing stereoscopic imaging, according to some embodiments of the present disclosure.
Figure 5C:
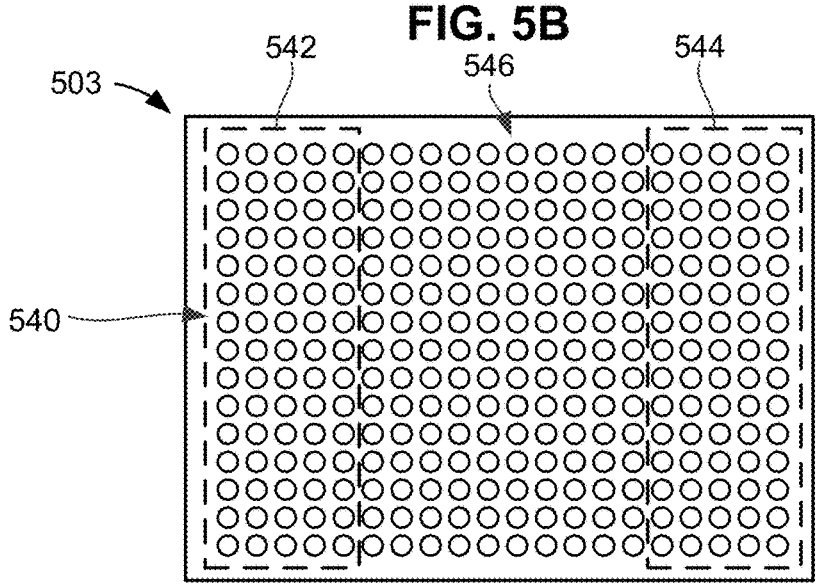
FIG. 5C is a simplified illustration of an example sensor array configured as a single m×n array of photosensors having two subsets of photosensors that are spaced apart from one another for performing stereoscopic imaging, according to some embodiments of the present disclosure

FIGS. 5A-5C are simplified illustrations of example sensor arrays configured in various ways. Specifically, FIG. 5A is a simplified illustration of an example sensor array 500 configured as two separate linear arrays of photosensors that are spaced apart from one another, FIG. 5B is a simplified illustration of an example sensor array 501 configured as two separate m×n arrays of photosensors that are spaced apart from one another, and FIG. 5C is a simplified illustration of an example sensor array 503 configured as a single m×n array of photosensors having two subsets of photosensors that are spaced apart from one another, for performing stereoscopic imaging, according to some embodiments of the present disclosure.

As shown in FIG. 5A, sensor array 500 can include a first array of photosensors 502 and a second array of photosensors 504 separated by a gap 506. First and second arrays of photosensors 502 and 504 can each be a linear array of photosensors arranged in a vertical orientation in some embodiments. To enable stereo image capture, each photosensor 508 of first array of photosensors 502 can be in the same path of rotation as a corresponding photosensor 510 in second array of photosensors 504. For instance, corresponding pairs of photosensors 508 and 510 can be in the same horizontal path of rotation when sensor array 500 is rotated around a vertical axis 512, e.g. center axis 218 in FIG. 2. That way, the field of view of first array of photosensors 502 can overlap with the field of view of the second array of photosensors 504 to capture the same image of the scene, but from different perspectives, when the field of view of sensor array 500 is moved, e.g., by physical rotation, as aforementioned herein with respect to FIGS. 3A-3B.

Gap 506 can be defined by the distance between corresponding photosensors between first array of photosensors 502 and second array of photosensors 504 that are positioned along a movement direction. For instance, if sensor array 500 is rotated around a vertical axis 512 so that its field of view moves horizontally across a scene, gap 506 can be defined by corresponding photosensors that are positioned along a horizontal line, e.g., the fourth photosensor from the top of first array of photosensors 502 and the fourth photosensor from the top of second array of photosensors 504 as shown in FIG. 5A. That way, the field of view of those photosensors may overlap when sensor array 500 rotates around vertical axis 512 to capture images for stereo imaging purposes. As discussed herein, gap 506 can be used to determine an optical baseline for calculating distances to objects in the scene and for generating images with a perception of depth. Accordingly, gap 506 can be any distance suitable for providing an optical baseline that can be used for triangulation to calculate distance to objects in a scene. For instance, gap 506 can range between 4 to 8 cm, such as approximately 6 cm.

It is to be appreciated that gap 506 is not limited to corresponding photosensors positioned along a horizontal line. As an example, if the axis of rotation is positioned at a diagonal, e.g., diagonal axis 514, then the gap defining the optical baseline can be defined by the distance between corresponding photosensors positioned along a line transverse to diagonal axis 514, such as diagonal rotational line 516. Accordingly, the corresponding photosensors would be the third photosensor from the bottom in first array of photosensors 502 and the third photosensor from the top in second array of photosensors 502, as shown in FIG. 5A. That way, the field of view of those photosensors may overlap when sensor array 500 rotates around diagonal axis 514 to capture images for stereo imaging purposes. It is to be appreciated that sensor array 500 can rotate in any direction to perform stereoscopic imaging, and thus be used to define a gap for establishing an optical baseline based on the direction of the movement of the field of view, without departing from the spirit and scope of the present disclosure.

In addition to linear arrays, some sensor arrays can have photosensors arranged as two separate m×n arrays where m and n are greater than 1. For instance, as shown in FIG. 5B, both a first array of photosensors 522 and a second array of photosensors 524 can each be formed of a 5×15 array of photosensors spaced apart by a distance 526. Having a greater number of photosensors in each array as compared to sensor array 500 can allow for each array of photosensors 522 and 524 to have a greater field of view than arrays of photosensors 502 and 504 so that fewer images may need to be captured to image a scene as sensor array 501 rotates 350°. The gap for determining the optical baseline may not be defined by distance 526 between arrays 522 and 524, because the field of view of a photosensor positioned at the right edge of first array of photosensors 522 may not correspond with the field of view of a photosensor positioned at the left edge of second array of photosensors 522 for stereoscopic imaging construction and distance calculation. Rather, the distance between corresponding photosensors in first array of photosensors 522 and second array of photosensors 524 may represent the gap used for calculating distance and creating perception of depth.

For instance, a gap 528 defined by the distance between corresponding photosensors, e.g., top left photosensor 520 of first array of photosensors 522 and top left photosensor 522 of second array of photosensors 524, can be used to determine an optical baseline for calculating distance and creating perception of depth. And, because the field of view of the two arrays overlap, the length of gap 528 may be shared across all corresponding photosensors. As an example, the length of a gap 534 defined by the distance between corresponding photosensors, e.g., bottom right photosensor 536 of first array of photosensors 522 and bottom right photosensor 538 of second array of photosensors 524, and all other gaps for corresponding photosensors, can be equal to the length of gap 528. That way, the field of view of first array of photosensors 522 can overlap with the field of view of second array of photosensors 522 to capture two offset images of the scene for stereo imaging and distance calculation purposes.

Although FIGS. 5A and 5B illustrate sensor arrays having two array of photosensors separated by a region of a sensor array with no photosensors, embodiments are not limited to such configurations. Rather, embodiments can be implemented in imager systems where the sensor array is configured as a single, two-dimensional array of photosensors. For example, with reference to FIG. 5C, sensor array 503 can include a single, 20×15 array of photosensors 540. Sensor array 503 can be configured to perform stereo imaging and distance calculation by allocating images captured by subsets of photosensors for stereo imaging and distance calculation purposes. Those subsets may be strategically positioned so that, as the field of view of sensor array 503 moves (e.g., by rotation), two offset images can be captured.

As an example, array of photosensors 540 can include two subsets of arrays of photosensors: a first subset of photosensors 542 and a second subset of photosensors 544 spaced apart from one another. The dimension, configuration, and operation of first and second subsets of photosensors 542 and 544 may correspond to the dimension, configuration, and operation of first and second arrays of photosensors 522 and 524 discussed herein with respect to FIG. 5B. The distance between first and second subsets of photosensors 542 and 544 may be populated with other photosensors 546 that may not be utilized for stereo imaging and distance calculation purposes, but for only capturing 2D images of the scene. As can be appreciated herein, some embodiments can utilize image sensors typically used for 2D image capture in a unique way to perform stereo imaging and distance calculation, and thus be more cost effective and simpler to design.

Although FIGS. 5A-5C illustrate example sensor arrays having linear arrays, 5×15 arrays, and 20×15 arrays, embodiments are not limited to such configurations. It is to be appreciated that embodiments herein can have any number, size, and arrangement of photosensors suitable for stereoscopic imaging and distance calculation purposes without departing from the spirit and scope of the present disclosure.

II. Active Stereoscopic Imager Systems

As discussed herein, stereoscopic imager systems can also be configured as active stereoscopic imager systems. Active stereoscopic imager systems can differ from passive stereoscopic imager systems in that active stereoscopic imager systems can also emit their own light into a field and detect the emitted light after it has reflected off surface(s) of an object in the field. In some embodiments, active stereoscopic imager systems can also be utilized as LIDAR devices where emitted and received, reflected light can be correlated to determine a distance to the object from which the emitted light was reflected. A large number of distance data points can be collected by an active stereoscopic imager system and processed to form a three-dimensional point cloud representing the scene in the field of view of the system as captured by the LIDAR device. A better understanding of an active stereoscopic imager system can be ascertained with reference to FIG. 6.

Figure 6:
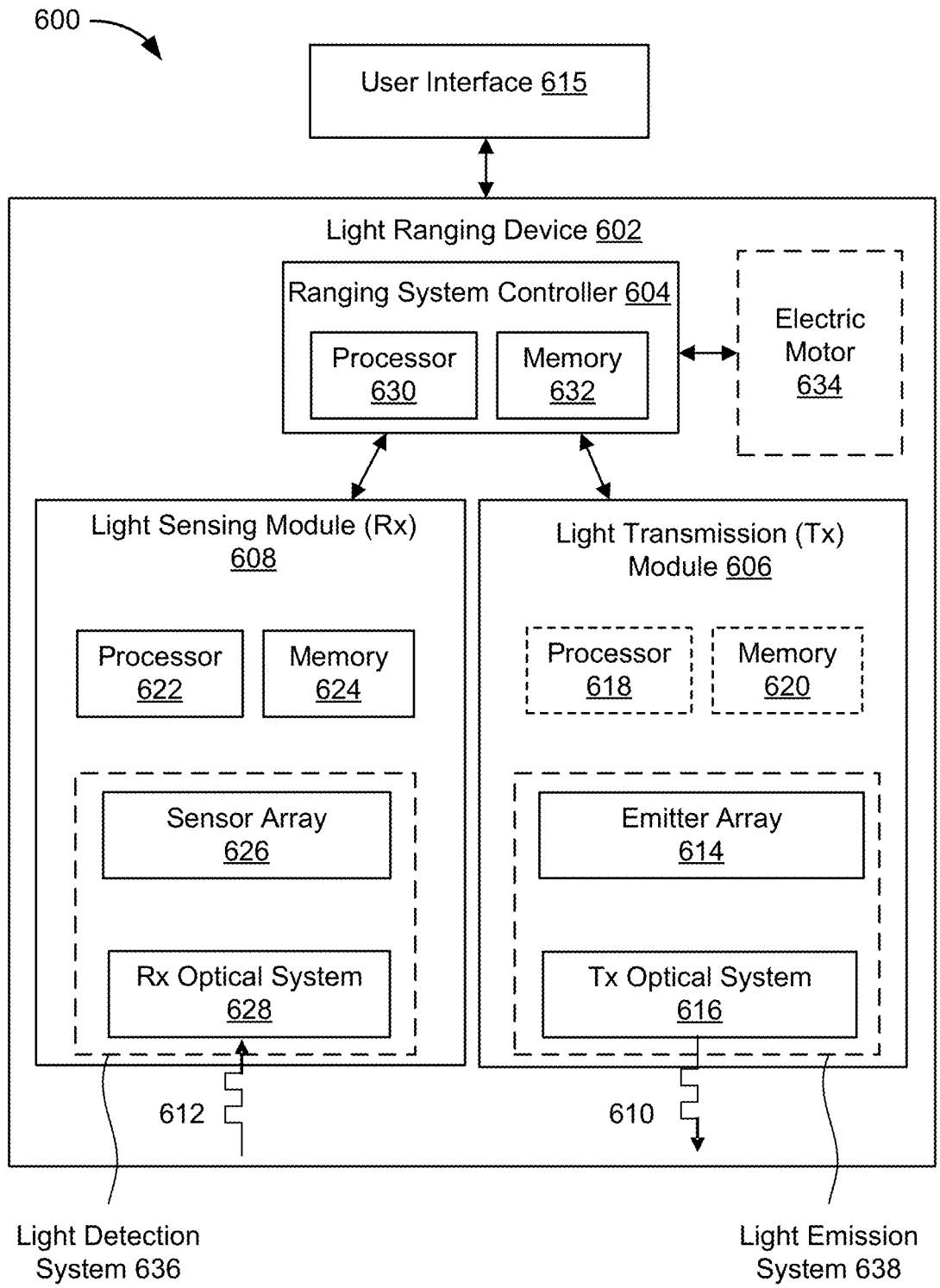
FIG. 6 is a block diagram of an example active stereoscopic system, according to some embodiments of the present disclosure.

FIG. 6 is a block diagram of an active stereoscopic system 600, according to some embodiments of the present disclosure. Active stereoscopic system 600 can include a light ranging device 602 and a user interface 615. Light ranging device 602 can include a ranging system controller 604, a light transmission (Tx) module 606 and a light sensing (Rx) module 608. Ranging data can be generated by light ranging device 602 by transmitting one or more light pulses 610 from the light transmission module 606 to objects in a field of view surrounding light ranging device 602. Reflected portions 612 of the transmitted light are then detected by light sensing module 608 after some delay time. Based on the delay time, the distance to the reflecting surface can be determined. Other ranging methods can be employed as well, e.g. continuous wave, Doppler, and the like.

Tx module 606 includes an emitter array 614, which can be a one-dimensional or two-dimensional array of emitters, and a Tx optical system 616, which when taken together with emitter array 614 can form a light emission system 638. Tx optical system 616 can include a bulk transmitter optic that is image-space telecentric. In some embodiments, Tx optical system 616 can further include one or more micro-optic structures that increase the brightness of beams emanating from the bulk transmitter optic and/or for beam shaping, beam steering or the like. Emitter array 614 or the individual emitters can be laser sources. Tx module 606 can further include an optional processor 618 and memory 620, although in some embodiments these computing resources can be incorporated into ranging system controller 604. In some embodiments, a pulse coding technique can be used, e.g., Barker codes and the like. In such cases, memory 620 can store pulse-codes that indicate when light should be transmitted. In some embodiments, the pulse-codes are stored as a sequence of integers stored in memory.

Light sensing module 608 can be substantially similar in construction to light sensing module 106 discussed herein with respect to FIG. 1. Thus, details of processor 622, memory 624, sensor array 626, and Rx optical system 628

(when taken together with sensor array 626 can form a light detection system 636) can be referenced herein with respect to FIG. 1, and only differences with respect to those components are discussed herein for brevity. For active stereoscopic system 600, sensor array 626 can include ranging photosensors. Each ranging photosensor can be a plurality of photodetectors, such as a mini-array of multiple single-photon avalanche detectors (SPADs), or a single photon detector (e.g., an APD). In some embodiments, the ranging photosensors of sensor array 626 can correspond to a particular emitter of emitter array 614, e.g., as a result of a geometrical configuration of light sensing module 608 and Tx module 606. For example, in some embodiments, emitter array 614 can be arranged along the focal plane of the bulk transmitter optic such that each illuminating beam projected from the bulk transmitter optic into the field ahead of the system is substantially the same size and geometry as the field of view of a corresponding receiver channel at any distance from the system beyond an initial threshold distance. In addition to the ranging photosensors, sensor array 626 can also include imaging photosensors. For instance, imaging photosensors such as CCD or CMOS sensors can be positioned and configured to capture images for stereoscopic imaging and distance calculation purposes. Such sensor arrays are discussed further herein with respect to FIG. 8.

In some embodiments, processor 618 can perform signal processing of the raw histograms from the individual photon detectors (or groups of detectors) in the array. As an example of signal processing, for each photon detector or grouping of photon detectors, memory 624 (e.g., SRAM) can accumulate counts of detected photons over successive time bins, and these time bins taken together can be used to recreate a time series of the reflected light pulse (i.e., a count of photons vs. time). This time-series of aggregated photon counts is referred to herein as an intensity histogram (or just histogram). Processor 618 can implement matched filters and peak detection processing to identify return signals in time. In addition, Processor 618 can accomplish certain signal processing techniques (e.g., by processor 622), such as multi-profile matched filtering to help recover a photon time series that is less susceptible to pulse shape distortion that can occur due to SPAD saturation and quenching. In some embodiments, all or parts of such filtering can be performed by processor 458, which may be embodied in an FPGA.

In some embodiments, the photon time series output from processor 618 are sent to ranging system controller 604 for further processing, e.g., the data can be encoded by one or more encoders of ranging system controller 604 and then sent as data packets to user interface 615. Ranging system controller 604 can be realized in multiple ways including, e.g., by using a programmable logic device such an FPGA, as an ASIC or part of an ASIC, using a processor 630 with memory 632, and some combination of the above. Ranging system controller 604 can cooperate with a stationary base controller or operate independently of the base controller (via pre-programed instructions) to control light sensing module 608 by sending commands that include start and stop light detection and adjust photodetector parameters. Similarly, ranging system controller 604 can control light transmission module 606 by sending commands, or relaying commands from the base controller, that include start and stop light emission controls and controls that can adjust other light-emitter parameters (e.g., pulse codes). In some embodiments, ranging system controller 604 has one or more wired interfaces or connectors for exchanging data with light sensing module 608 and with light transmission module 606. In other embodiments, ranging system controller 604 communicates with light sensing module 608 and light transmission module 606 over a wireless interconnect such as an optical communication link.

Light ranging device 602 can be used in scanning architectures where Rx module 608 and Tx module 606 physically rotates together by way of an electric motor 634, or the field of view rotates via a mirror device, such as a MEMS device, while Rx module 608 and Tx module 606 are stationary. Thus, electric motor 634 is an optional component in active stereoscopic imager system 600 that can be used to rotate system components, e.g., Tx module 606 and Rx module 608, as part of a LIDAR and stereo image capture architecture. System controller 604 can control electric motor 634 and can start rotation, stop rotation and vary the rotation speed as needed to implement a scanning system.

Active stereoscopic imager system 600 can interact with one or more instantiations of a user interface 615. The different instantiations can vary and can include, but not be limited to, a computer system with a monitor, keyboard, mouse, CPU and memory; a touch-screen in an automobile or other vehicle; a handheld device with a touch-screen; or any other appropriate user interface. User interface 615 can be local to the object upon which active stereoscopic imager system 600 is mounted but can also be a remotely operated system. For example, commands and data to/from active stereoscopic imager system 600 can be routed through a cellular network (LTE, etc.), a personal area network (Bluetooth, Zigbee, etc.), a local area network (WiFi, IR, etc.), or a wide area network such as the Internet.

User interface 615 of hardware and software can present the LIDAR data from the device to the user or to a vehicle control unit (not shown) but can also allow a user to control active stereoscopic imager system 600 with one or more commands. Example commands can include commands that activate or deactivate the active stereoscopic imager system, specify photodetector exposure level, bias, sampling duration and other operational parameters (e.g., emitted pulse patterns and signal processing), specify light emitters parameters such as brightness. In addition, commands can allow the user to select the method for displaying results. The user interface can display active stereoscopic imager system results which can include, e.g., a single frame snapshot image, a constantly updated video image, and/or a display of other light measurements for some or all pixels. In some embodiments, user interface 615 can track distances (proximity) of objects from the vehicle, and potentially provide alerts to a driver or provide such tracking information for analytics of a driver's performance.

In some embodiments, for example where active stereoscopic imager system 600 is used for vehicle navigation, user interface 615 can be a part of a vehicle control unit that receives output from, and otherwise communicates with light ranging device 602 and/or user interface 615 through a network, such as one of the wired or wireless networks described above. One or more parameters associated with control of a vehicle can be modified by the vehicle control unit based on the received ranging data. For example, in a fully autonomous vehicle, active stereoscopic imager system 600 can provide a real time 3D image of the environment surrounding the car to aid in navigation in conjunction with GPS and other data. In other cases, active stereoscopic imager system 600 can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. When user interface 615 is implemented as part of a vehicle control unit, alerts can be provided to a driver or tracking of a proximity of an object can be tracked.

Figure 7:
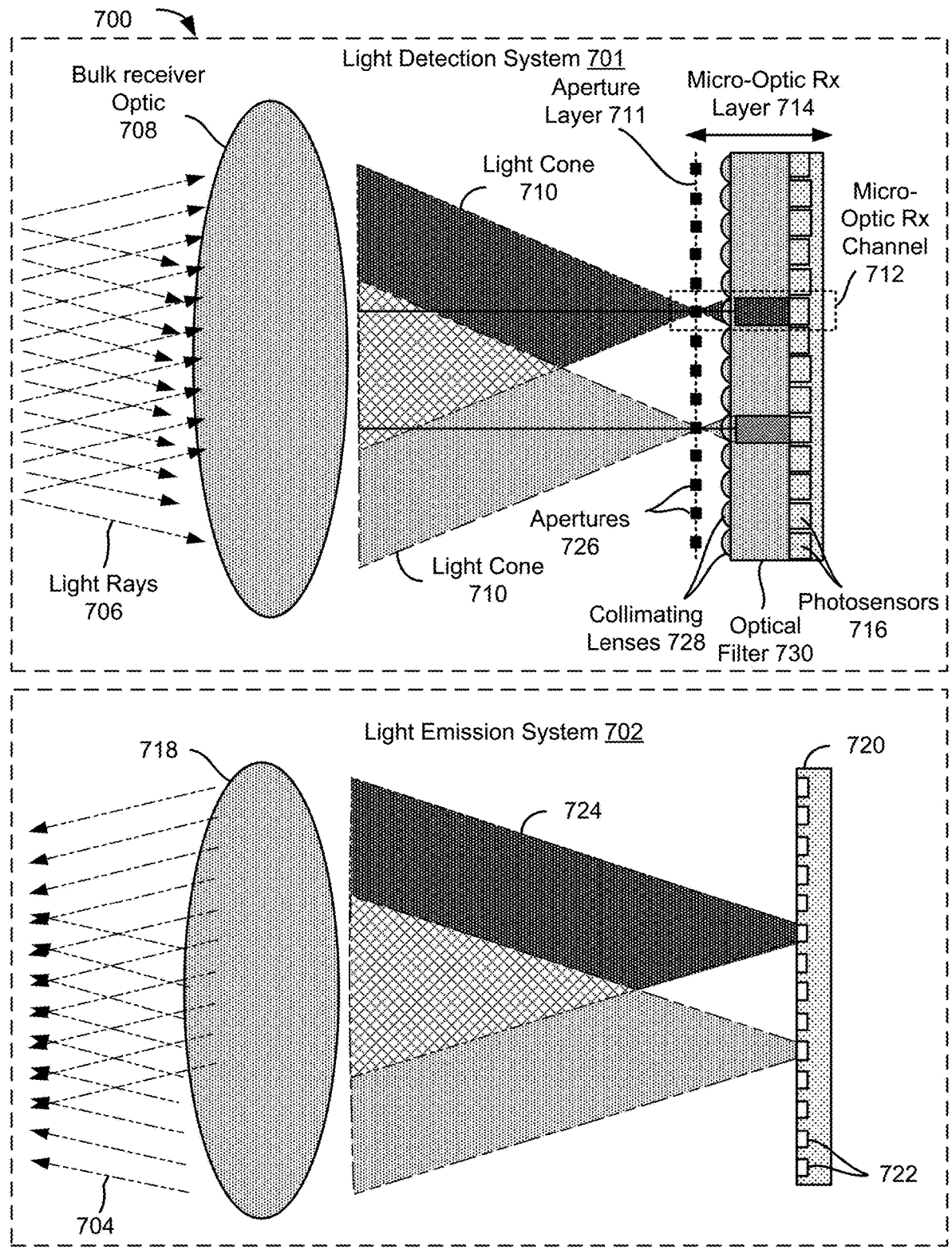
FIG. 7 is a simplified diagram of an example light detection system, according to some embodiments of the present disclosure

FIG. 7 is a simplified diagram illustrating a detailed view of an exemplary active stereoscopic imager system 700 having a wide field-of-view and capable of narrowband imaging, according to some embodiments of the present disclosure. Unlike passive stereoscopic imager systems, active stereoscopic imager system 700 can include both a light detection system 701 and a light emission system 702. Light emission system 702 provides active illumination of at least a portion of a field in which system 700 is positioned with narrowband light rays 704. Light detection system 701 detects the narrowband light emitted from the light emission system 702 after it has been reflected by objects in the field as reflected light rays 706.

A. Light Emission System

In some embodiments, light emission system 702 includes a bulk transmitter optic 718 and a light emitting layer 720 formed of a one- or two-dimensional array of light emitters 722. Each light emitter 722 can be configured to generate discrete beams of narrowband light. In some embodiments, light emitting layer 720 is configured to selectively project the discrete beams of light through bulk transmitter optic 718 according to an illumination pattern that matches, in size and geometry across a range of distances from light emission system 702, the fields of view of corresponding receiver channels in micro-optic receiver channel array 714. Light emitters 722 can be any suitable light emitting device, such as a vertical-cavity surface-emitting lasers (VCSELS) integrated on one or more monolithic chip, or any other type of laser diode. Light emitters 722 can produce cones of narrowband light 724 that are directed to bulk transmitter optic 718, which can collimate cones of light 724 and then output the collimated light to distant targets in the field as emitted light rays 704. In some embodiments, bulk transmitter optic 718 is image-space telecentric.

B. Light Detection System

Once the light is emitted into the field by light emission system 702, corresponding ranging photosensors in light detection system 701 can receive the emitted light once they have reflected off of objects in the field. The received reflected light can be used to identify distances to the objects in the field. According to some embodiments of the present disclosure, light detection system 701 can also include imaging photosensors for performing stereoscopic imaging, as will be discussed further herein.

Light detection system 701 can be representative of light detection system 112 discussed above with respect to FIG. 1 and can include a bulk receiver optic 708 and a micro-optic receiver (Rx) layer 714. During operation, light rays 706 enter bulk receiver optic 708 from multiple directions and gets focused by bulk receiver optic 708 to form light cones 710. Micro-optic receiver layer 714 is positioned so that apertures 726 coincide with the focal plane of bulk receiver optic 708. In some embodiments, micro-optic receiver layer 714 can be a one-dimensional or two-dimensional array of micro-optic receiver channels 712, where each micro-optic receiver channel 712 is formed of a respective aperture 726, collimating lens 728, and photosensor 716 positioned along the same axis in the direction of light flow, e.g., horizontal from left to right as shown in FIG. 2. Furthermore, each micro-optic receiver channel 712 can be configured various ways to mitigate interference from stray light between photosensors, as will be discussed further herein. During operation, each micro-optic receiver channel 712 measures light information for a different pixel (i.e., position in the field).

At the focal point of bulk receiver optic 708, light rays 706 focus and pass through apertures 726 in an aperture layer 711 and into respective collimating lenses 728. Each collimating lens 728 collimates the received light so that the light rays all enter the optical filter at approximately the same angle, e.g., parallel to one another. The aperture and focal length of bulk receiver optic 708 determine the cone angle of respective light rays that come to a focus at aperture 726. The aperture size and the focal length of collimating lenses 728 determine how well-collimated the admitted rays can be, which determines how narrow of a bandpass can be implemented in optical filter 730 to block unwanted wavelengths of light. Apertures 726 can serve various functions during the operation of light detection system 701. For instance, apertures 726 can (1) constrain the pixel FOV so it has tight spatial selectivity despite a large pitch at the photosensor plane, (2) provide a small point-like source at the collimating lens's focal plane to achieve tight collimation of rays before passing through the filter, where better collimation results in a tighter band that can pass through the filter, and (3) reject stray light.

In some embodiments, photosensors 716 are positioned on a side opposite of collimating lenses 728 so that light rays 706 first pass through collimating lenses 728 and optical filter 730 before exposing on photosensors 716. Some photosensors 716 can be ranging photosensors configured to receive the emitted light, such as a plurality of photodetectors, e.g., a mini-array of multiple single-photon avalanche detectors (SPADs). An array of mini-arrays of SPADs can be fabricated on a single monolithic chip, thereby simplifying fabrication. In some alternative embodiments, each photosensor 716 can be a single photodetector, e.g., a standard photodiode, an avalanche photodiode, a resonant cavity photodiode, or another type of photodetector. Other photosensors can be configured as imaging photosensors for stereoscopic imaging purposes, as will be discussed further herein.

C. Sensor Array for Active Stereoscopic Imaging

As discussed above, an active stereoscopic imager system can have a sensor array that includes ranging photosensors and imaging photosensors. The ranging photosensors can correlate with the emitters so that light, e.g., narrowband laser light, emitted by the emitters can be captured by the ranging photosensors for calculating distances via time-of-flight measurements and the like. The imaging photosensors may not be configured to capture emitted light, but can be instead configured to capture offset red-green-blue (RGB) images of the scene from ambient light for stereo imaging and distance calculation purposes. In such embodiments, the distance calculated by way of stereo imaging can be used to augment measurements made by the ranging photosensors and/or to fill in measurement gaps where ranging photosensors may not be as accurate, such as measurements for very near range (e.g., 0-2 meters) and the like. An example of such a sensor array is discussed herein with respect to FIG. 8.

Figure 8:
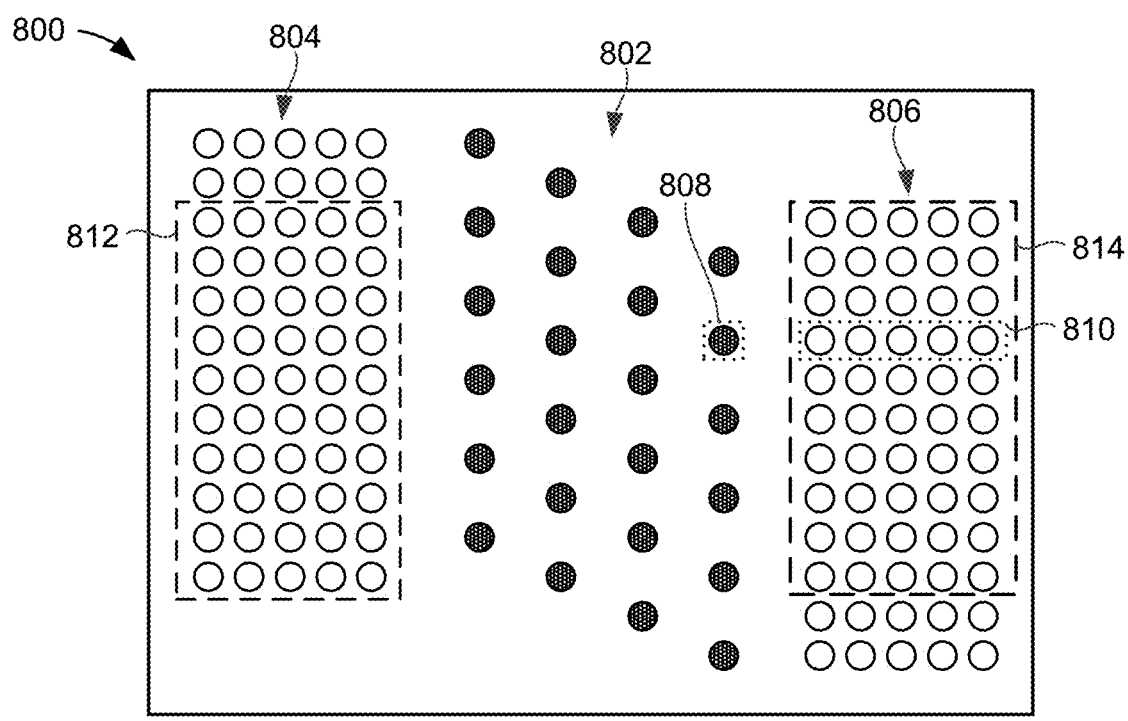
FIG. 8 is a simplified illustration of an example sensor array for an active stereoscopic imager system, according to some embodiments of the present disclosure.

FIG. 8 is a simplified illustration of an example sensor array 800 for an active stereoscopic imager system, according to some embodiments of the present disclosure. Sensor array 800 can include an array of ranging photosensors 802 positioned between two arrays of imaging photosensors: a first array of imaging photosensors 804 and a second array of imaging photosensors 806. Array of ranging photosensors 802 can be the same type of photosensor than first and second arrays of imaging photosensors 804 and 806. For instance, ranging photosensors 802 and imaging photosensors 804 and 806 can be SPADs or other avalanche diode sensors configured to measure narrowband laser light. However, the light sensed by either array of photosensors can be different. As an example, ranging photosensors 802 can sense light emitted from the emitter array whereas imaging photosensors 804 and 806 are configured to sense ambient light. To enable imaging photosensors 804 and 806 to measure light, the optical filter in the receiver channels for corresponding photosensors 804 and 806 may be configured to allow certain wavelengths of visible light.

In some additional and alternative embodiments, array of ranging photosensors 802 can be a different type of photosensor than first and second arrays of imaging photosensors 804 and 806. As an example, array of ranging photosensors 802 can be SPADs or other avalanche diode sensors, whereas first and second arrays of imaging photosensors 804 and 806 can be CCD, CMOS, and other similar types of photosensors configured to measure a wider band of light, e.g., visible RGB ambient light.

Because of its correlation with the emitter array, array of ranging photosensors 802 can have an array size and photosensor pitch suitable for receiving light emitted by the emitter array, while first and second arrays of imaging photosensors 804 and 806 can have an array size and photosensor pitch different from both the emitter array and the array of ranging photosensors 802. For instance, as shown in FIG. 8, array of ranging photosensors 802 can have a diagonally staggered arrangement in a downward translation to the right, and first and second arrays of imaging photosensors 804 and 806 can each have a two-dimensional, rectangular m×n arrangement of imaging photosensors that are more densely packed than array of ranging photosensors 802. In such embodiments, each ranging photosensor, e.g., ranging photosensor 808, can correspond to a set of imaging photosensors, e.g., set of imaging photosensors 810, that are in the same row as the corresponding ranging photosensor 808, so that as sensor array 800 rotates around to image the scene, set of imaging photosensors 810 can capture ambient light existing at the same field of view as ranging photosensor 808 when each photosensor of set of imaging photosensors 810 is correspondingly positioned. Thus, light captured by sensor array 800 can be used to construct a topographical map of the scene, as well as an RGB image of the scene that is highly correlated with the topographical map of the scene.

In addition to device type, pitch, and arrangement differences, array of ranging photosensors 802 can be constructed of photosensors that have a different size than first and second arrays of imaging photosensors 804 and 806. As an example, a ranging photosensors can have larger dimensions than an image photosensor. That way, the ranging photosensor can be better equipped to measure emitted light that is reflected off of objects in the scene, such as by being constructed of a SPAD.

According to some embodiments of the present disclosure, subsets of imaging photosensors from first and second arrays of imaging photosensors 804 and 806 can be allocated to provide data that can be used for stereo imaging purposes, such as the stereo imaging purposes discussed herein with respect to FIGS. 3A-3C and 5A-5B. For example, a first subset of imaging photosensors 812 from first array of photosensors 804 and a second subset of imaging photosensors 814 from second array of photosensors 804 and 806 can be used for stereoscopic imaging purposes. In some embodiments, first and second subsets of imaging photosensors 812 and 814 can each include a portion of the entire array of imaging photosensors in the first and second arrays of photosensors 804 and 806, as shown in FIG. 8. This may be because those imaging photosensors (e.g. the top to rows of first array of imaging photosensors 804 and the bottom two rows of the second array of imaging photosensors 806) that are not part of the subsets of imaging photosensors may not have corresponding photosensors in the other array 804/806 that are positioned in the same path of rotation, e.g., the same horizontal line in instances where sensor array 800 rotates around a vertical axis. Thus, those imaging photosensors may not have a corresponding offset image for stereo imaging purposes.

As can be appreciated with reference to FIG. 8, subset of imaging photosensors 812 can be spaced apart from subset of imaging photosensors 814, and thus be corresponding subsets of imaging photosensors for generating two offset images of a scene for calculating distance and creating perception of depth. Subsets of imaging photosensors 812 and 814 can have similar features and arrangements as arrays of photosensors 622 and 624 and subsets of photosensors 642 and 644 discussed herein with respect to FIGS. 5B and 5C.

In some embodiments, the accuracy of distances measured by array of ranging photosensors 802 can be augmented and/or superseded by distance measurements calculated from analysis of the two offset stereo images captured by subsets of imaging photosensors 812 and 814. As an example, accuracy of measurements at very close distances, e.g., 0-2 meters, measured by array of ranging photosensors 802 may be lower than its accuracy of measurements at farther distances, e.g., 2+ meters. Thus, those distances calculated by array of ranging photosensors 802 can be augmented by distances calculated by analysis of the stereo image pair. One way of augmenting the measurements can be by averaging the two distances together. That way, a more accurate measurement of the distance can be ascertained. In some additional and alternative embodiments, those distances calculated by array of ranging photosensors 802 can be replaced by distances calculated by analysis of the stereo image pair. In such instances, those distances calculated by array of ranging photosensors 802 can simply be ignored. Either form of augmentation can be performed by default, or in response to a determination that the difference between the first and second distances is greater than a threshold.

III. Method of Operating Stereoscopic Imager Systems

Figure 9:
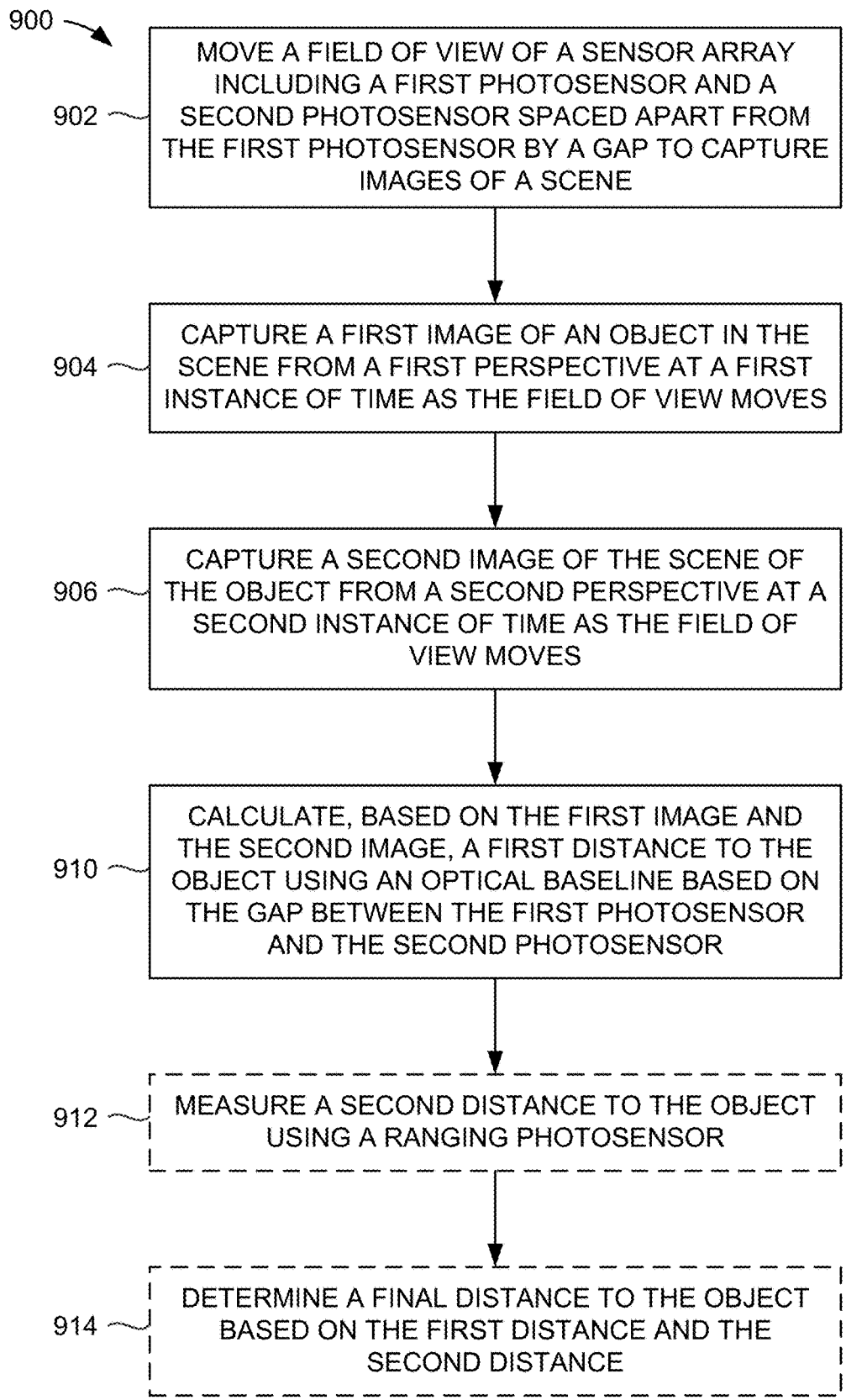
FIG. 9 is a block diagram of an example method of operating a stereoscopic imager system to perform stereoscopic imaging using light detections systems, according to some embodiments of the present disclosure.

FIG. 9 is a block diagram of an example method 900 of operating a stereoscopic imager system to perform stereoscopic imaging using light detections systems, according to some embodiments of the present disclosure. At step 902, a field of view of a sensor array can be moved to capture images of a scene. For instance, the sensor array can be rotated around a center axis, as discussed herein with respect to FIGS. 3A-3C, or one or more mirrors, such as a MEMS device, can be moved to alter the field of view of the sensor array. The sensor array can include a first photosensor and a second photosensor spaced apart from the first photosensor to capture the images of the scene. As an example, the first photosensors can be any photosensor from first array/subset of photosensors 502, 522, 542, and 804, and the second photosensor can be any photosensor from second array/subset of photosensors 504, 524, 544, and 806 corresponding to the first photosensor, as discussed herein with respect to FIGS. 5A-5C and 8. In some embodiments, the first photosensor and the second photosensor can be separated by a gap, e.g., gap 506 or 528 discussed herein with respect to FIGS. 5A-5B.

At step 904, a first image of the object in the scene can be captured from a first perspective at a first instance of time as the field of view of the sensor array moves. As an example, as the sensor array rotates around the center axis, a first array of photosensors including the first photosensor can capture an image of the object in the scene, as discussed herein with respect to FIG. 3A. Then, at step 906, as the sensor array continues to move, but before making a full 360° rotation after the first image is captured, a second image of the object in the scene can be captured from a second perspective at a second instance of time. For instance, as the sensor array rotates around the center axis, a second array of photosensors including the second photosensor can capture an image of the object in the scene, as discussed herein with respect to FIG. 3B. The dimensions of the field of view for the first and second arrays of photosensors can be the same so that the two images can form a stereo image pair.

At step 910, the first image and the second image can be analyzed to calculate a first distance to the object in the scene using an optical baseline based on the gap between the first photosensor and the second photosensor. In some embodiments, a processor, e.g., processor 122 of system controller 104 discussed herein with respect to FIG. 1, of the stereoscopic imager system 100 can receive the first and second images, compare shared features of the object apparent in the first and second images, and use the distance between those shared features to identify a distance to the object using triangulation, as discussed herein with respect to FIG. 5. Accordingly, embodiments of the present disclosure can use a two-dimensional sensor array to capture distance to objects in the scene.

As discussed herein with respect to FIGS. 7 and 8, the stereoscopic imager system can be an active stereoscopic imager system that can also perform ranging using an emitter array and ranging photosensors for measuring the light emitted by the emitter array after it has reflected off the object in the scene. Accordingly, method 900 can optionally include step 912, where a second distance to the object can be measured. The second distance can be measured by a ranging photosensor that measures light emitted by a corresponding light emitter once the light has reflected off of the object in the scene. Time-of-flight measurements and the like can be used to calculate the distance to the object.

Thereafter, at step 914, a final distance to the object can be determined based on the first distance and the second distance. As an example, the first distance can be used to augment the accuracy of the second distance, especially for very close range measurements, as discussed herein with respect to FIGS. 7 and 8. In some other instances, the first distance can replace the second distance. Either form of augmentation can be performed by default, or in response to a determination that the difference between the first and second distances is greater than a threshold.

IV. Mitigating Receiver Channel Cross-Talk

As can be appreciated by disclosures herein, channels in the micro-optic receiver and are positioned very close to one another, often times within microns of one another. This small spacing between each channel can invite the opportunity for problems to arise. For instance, light propagating through bulk imaging optic can occasionally cause stray light to bleed into neighboring channels, thereby resulting in inaccurate readings of reflected light for each pixel in the field. Ideally, no stray light should be received by any channel, as shown in FIG. 10A.

Figure 10A:
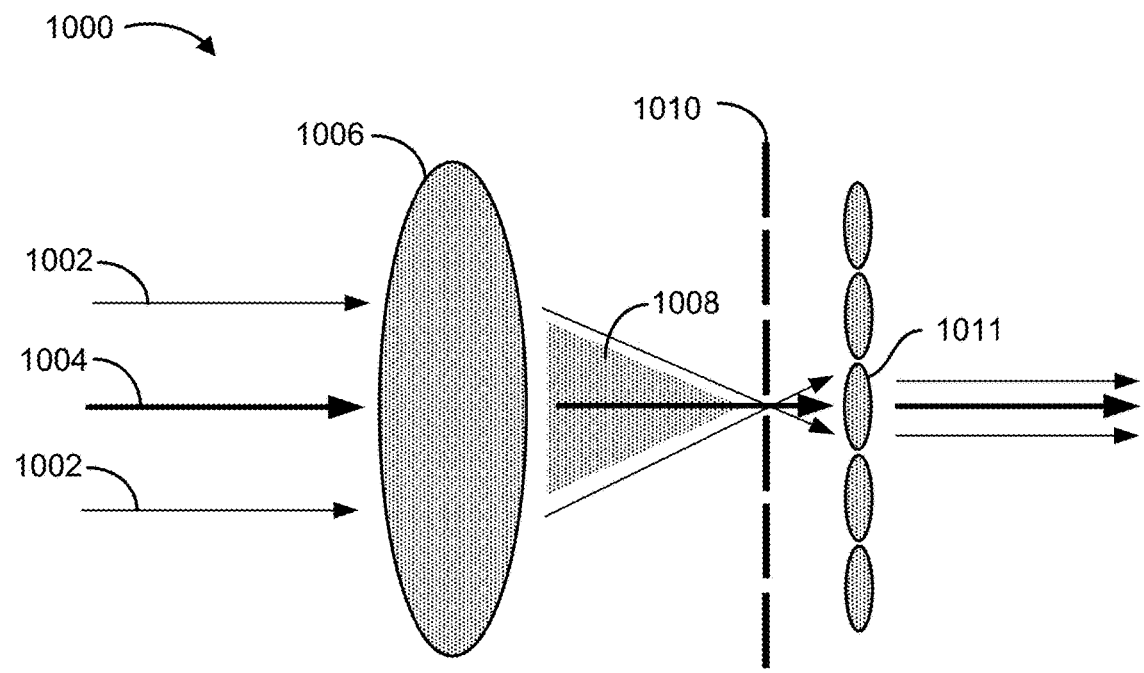
FIG. 10A is a simplified cross-sectional view diagram of part of a light detection system where there is no cross-talk between channels.

FIG. 10A is a simplified cross-sectional view diagram of part of a light detection system 1000 where there is no cross-talk between channels. During operation, perpendicular light rays 1002 and chief ray 1004 enter the bulk imaging optic 1006 and produce light cone 1008. Light rays 1002 and 1004 enter an aperture of aperture layer 1010 and enter collimating lens 1011. Collimating lens 1011 accepts a limited range of incident light angles. For example, collimating lens 1011 can accept light rays at incident angles between +25 to −25 degrees relative to the perpendicular. FIG. 10A shows light cone 1008 with incident angles between +25 to −25 degrees. The chief ray 1004 is the light ray that passes through the center of the aperture. In this example, the chief ray 1004 has an incident angle of 0 degrees on the collimating lens 1011.

Figure 10B:
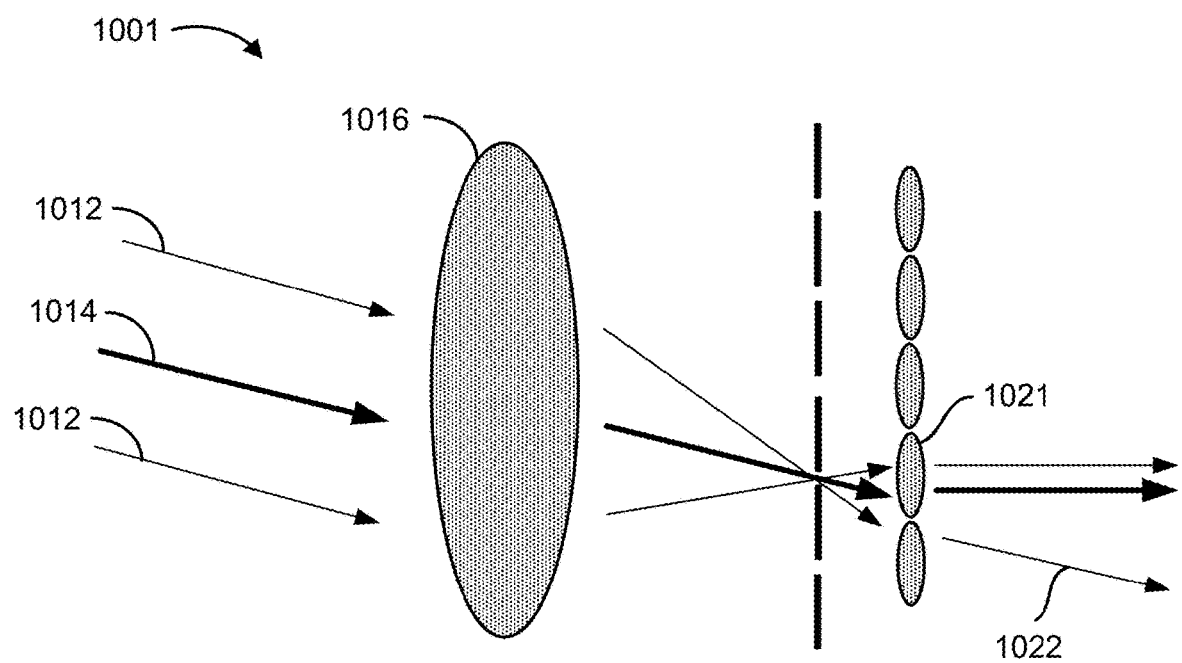
FIG. 10B is a simplified cross-sectional view diagram of part of a light detection system where there is cross-talk between channels.

FIG. 10B is a simplified cross-sectional view diagram of part of a light detection system 1001 where there is cross-talk between channels. In this case, during operation, oblique light rays 1012 and chief ray 1014 enter bulk receiver optic 1016 and later enter collimating lens 1021. In this example, collimating lens 1021 belongs to a micro-optic channel that corresponds to a photosensor further from the center of the image. In this example, chief ray 1014 has an incident angle of −12 degrees and the cone of focused light has incident angles between +12 degrees to −35 degrees. Collimating lens 1021 rejects some of the light rays because it only accepts light with incident angles between +25 to −25 degrees. Additionally, the rays that are outside of the collimating lens acceptance cone can travel to other optical surfaces and become stray light. Thus, a non-telecentric bulk imaging optic will deliver significantly fewer signal photons to the photodetector, while potentially polluting other channels with errant light rays 1022. A telecentric bulk imaging optic, on the other hand, will produce light cones with incident angles approximately between +25 to −25 degrees and chief rays with incident angles on the collimating lens of approximately 0 degrees, regardless of the angle of the oblique rays 1012 and chief ray 1014. A telecentric bulk imaging optic has similar benefits for the transmitter when the lasers are telecentric (their chief rays are all parallel) as is the case for VCSELS or a side emitter diode laser bar.

In some embodiments, the light detection system of a light sensing module uses an input image-space telecentric bulk imaging optic. In some other embodiments, for example where cost or increased field of view is more important than performance, the light detection system may use a more standard input bulk imaging optic such as a bi-convex lens. For any given input field into an image-space telecentric lens, the resulting chief rays are parallel to the optical axis, and the image-side ray cones all span approximately the same set of angles. This allows micro-optic channels far from the optical axis in the light detection system to achieve similar performance to the on-axis micro-optic channel. The light detection system does not need perfect image space telecentricity for this to work, but the closer to perfect telecentricity the better. For a micro-optic receiver optical layer lens that can only accept +/−25 degree light, the preference is that the input bulk imaging optic produce image-side rays that are no greater than 25 degrees in angle for every point on the focal plane.

Figure 11:
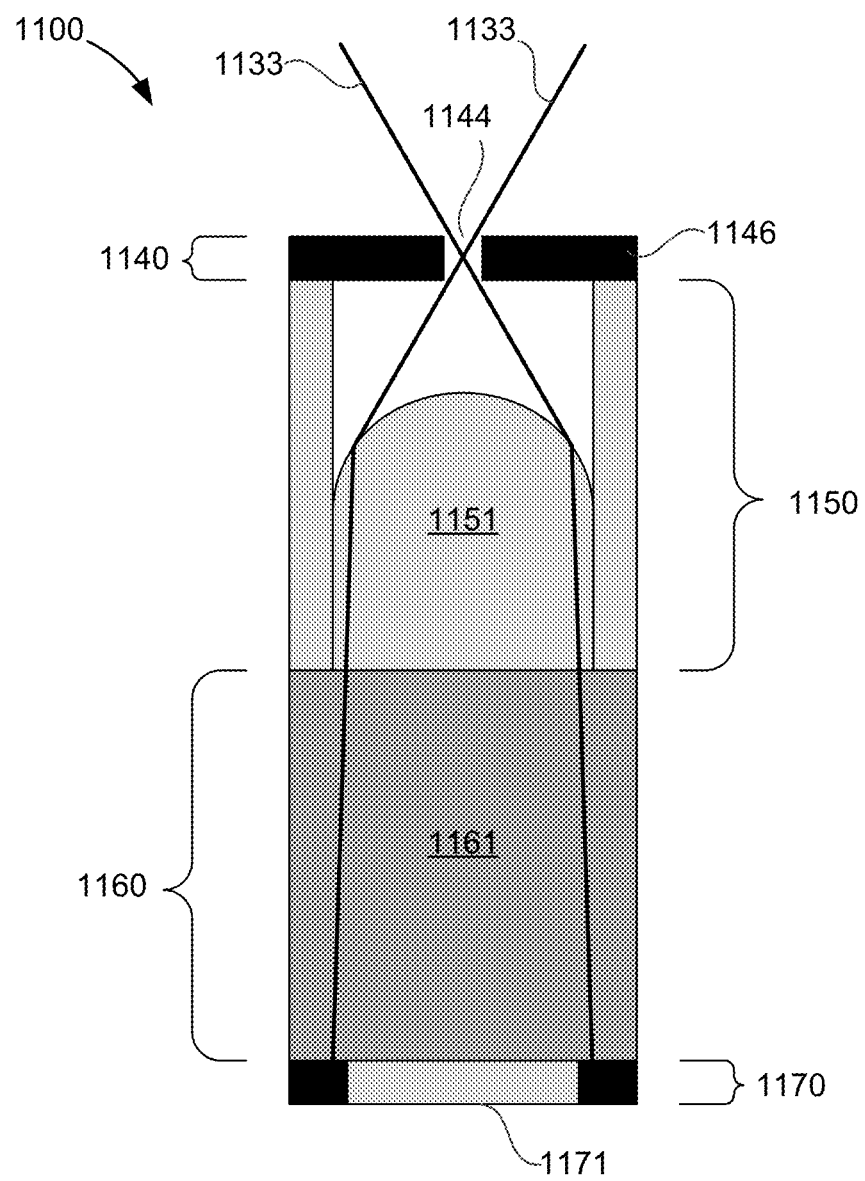
FIG. 11 is a simplified cross-sectional diagram of an example micro-optic receiver channel structure, according to some embodiments of the present disclosure.

According to some embodiments of the present disclosure, the design of each channel of the micro-optic receiver channel array can be specifically configured to have features that minimize the intrusion of stray light onto a respective photodetector, thereby reducing or eliminating any detrimental effects caused by the occurrence of stray light. FIG. 11 is a simplified cross-sectional diagram of an example micro-optic receiver channel structure 1100, also called a micro-optic receiver channel in discussions herein. Receiver channel 1100 can be representative of micro-optic receiver channels 712 shown in FIG. 7, and serves to accept an input cone of light containing a wide range of wavelengths, filters out all but a narrow band of those wavelengths centered at the operating wavelength, and allows photosensor 1171 to detect only or substantially only photons within the aforementioned narrow band of wavelengths. According to some embodiments of the present disclosure, micro-optic receiver channel structures, such as receiver channel 1100, can include the following layers:

An input aperture layer 1140 including an optically transparent aperture 1144 and optically non-transparent stop region 1146 configured to define a narrow field of view when placed at the focal plane of an imaging optic such as bulk receiver optic 708 (shown in FIG. 7; not shown in FIG. 11). Aperture layer 1140 is configured to receive the input marginal ray lines 1133. The term "optically transparent" herein refers to as allowing most or all light to pass through. Light herein refers to spectrum of light in the near-ultraviolet, visible, and near-infrared range (e.g. 300 nm to 5000 nm). Optically non-transparent herein refers to as allowing little to no light to pass through, but rather absorbing or reflecting the light. Aperture layer 1140 can include optically transparent apertures separated from each other by optically non-transparent stop regions. The apertures and stop regions can be built upon a single monolithic piece such as an optically transparent substrate. Aperture layer 1140 can optionally include a one-dimensional or two-dimensional array of apertures 1144.

An optical lens layer 1150 including a collimating lens 1151 characterized by a focal length, offset from the plane of aperture 1144 and stop region 1146 by the focal length, aligned axially with aperture 1144, and configured to collimate photons passed by the aperture such that they are traveling approximately parallel to the axis of collimating lens 1151 which is aligned with the optical axis of receiver channel 1100. Optical lens layer 1150 may optionally include apertures, optically non-transparent regions and tube structures to reduce cross talk.

An optical filter layer 1160 including an optical filter 1161, typically a Bragg reflector type filter, adjacent to collimating lens 1151 and opposite of aperture 1144. Optical filter layer 1160 can be configured to pass normally incident photons at a specific operating wavelength and passband. Optical filter layer 1160 may contain any number of optical filters 1161. Optical filter layer 1160 may optionally include apertures, optically non-transparent regions and tube structures to reduce cross talk.

A photosensor layer 1170 including a photosensor 1171 adjacent to optical filter layer 1160 and configured to detect photons incident on photosensor 1171. Photosensor 1171 herein refers to a single photodetector capable of detecting photons, e.g., an avalanche photodiode, a SPAD (Single Photon Avalanche Detector), RCP (Resonant Cavity Photo-diodes), and the like, or several photodetectors, such as an array of SPADs, cooperating together to act as a single photosensor, often with higher dynamic range, lower dark count rate, or other beneficial properties as compared to a single large photon detection area. Photosensor 1171 can also refer to visible light photosensors, such as CCD and CMOS sensors for capturing stereo images. Each photodetector can be an active area that is capable of sensing photons, i.e., light. Photosensor layer 1170 refers to a layer made of photodetector(s) and contains optional structures to improve detection efficiency and reduce cross talk with neighboring receiver structures. Photosensor layer 1170 may optionally include diffusers, converging lenses, apertures, optically non-transparent tube spacer structures, optically non-transparent conical spacer structures, etc.

Stray light may be caused by roughness of optical surfaces, imperfections in transparent media, back reflections, and the like, and may be generated at many features within the receiver channel 1100 or external to receiver channel 1100. The stray light may be directed: through the filter region 1161 along a path non-parallel to the optical axis of collimating lens 1151; reflecting between aperture 1144 and collimating lens 1151; and generally taking any other path or trajectory possibly containing many reflections and refractions. If multiple receiver channels are arrayed adjacent to one another, this stray light in one receiver channel may be absorbed by a photosensor in another channel, thereby contaminating the timing, phase, or other information inherent to photons. Accordingly, receiver channel 1100 may feature several structures to reduce crosstalk between receiver channels.

V. Implementation of Stereoscopic Imager Systems

FIG. 12A is a top-down view of a simplified diagram of an example stereoscopic imager system 1200 implemented for a vehicle 1205, such as a car, and capable of continuous 360 degree scanning, according to some embodiments of the present disclosure. The output beam(s) of one or more light sources (such as infrared or near-infrared pulsed IR lasers, not shown) located in stereoscopic imager system 1200, can be scanned, e.g., rotated, to illuminate a continuous scene 1220 around the vehicle. In some embodiments, the scanning, represented by rotation arrow 1215, can be implemented by any suitable mechanical means, e.g., by mounting the light emitters to a rotating column or platform, or any other mechanical means, such as through the use of galvanometers or chip-based steering techniques. During operation, objects around vehicle 1205 in any direction and within the view of stereoscopic imager system 1200 can reflect portions of light pulses 1211 that are emitted from a transmitting module 1208 in stereoscopic imager system 1200. One or more reflected portions 1217 of light pulses 1211 then travel back to stereoscopic imager system 1200 and can be detected by its sensing module 1209. Additionally, ambient light from scene 1220 can be captured to generate two offset images for distance calculation and depth perception purposes. In some instances, sensing module 1209 can be disposed in the same housing as transmitting module 1208.

Although FIG. 12A illustrates solid state stereoscopic imager systems mounted on a roof of a vehicle 1205, embodiments are not limited to such configurations. Other embodiments can have solid state stereoscopic imager systems mounted on other regions of a vehicle. For instance, stereoscopic imager systems can be mounted at the corners of a vehicle, as shown in FIG. 12B. FIG. 12B illustrates an implementation 1201 where solid state stereoscopic imager systems 1204a-d are implemented at the outer regions of a road vehicle, such as a car, according to some embodiments of the present disclosure. In this implementation, each stereoscopic imager system 1204a-d can be a spinning stereoscopic imager system that can measure distances around the full 360 degrees. However, since at least some of those measurements will be measured with respect to vehicle 1205, those measurements can be ignored. Thus, each stereoscopic imager system 1205a-d can utilize a subset of the measurements from 360 degree scanning, e.g., only the angles covering regions 1219a-d that do not capture vehicle 1205 are utilized.

Although the present disclosure has been described with respect to specific embodiments, it will be appreciated that the present disclosure is intended to cover all modifications and equivalents within the scope of the following claims.

What is claimed is:

1. A stereoscopic imager system, comprising:
   a sensor array comprising:
      a plurality of ranging photosensors that detect light emitted from an emitter array once it has reflected off of an object in a scene;
      a first plurality of imaging photosensors positioned at a first side of the ranging photosensors; and
      a second plurality of imaging photosensors positioned at a second side of the ranging photosensors opposite from the first side, the first plurality of imaging photosensors and the second plurality of imaging photosensors detect ambient light in the scene and are spaced apart by a gap;
   a moving component coupled to the sensor array and operable to move the sensor array between a first position and a second position within a full rotational image capturing cycle; and
   a system controller coupled to the sensor array and the moving component, the system controller configured to:
      determine a first distance to an object in the scene using the plurality of ranging photosensors by way of time-of-flight calculations;
      capture a first image of the scene at the first position with the first plurality of imaging photosensors and a second image of the scene at the second position with the second plurality of imaging photosensors;
      calculate a second distance to the object based on the first image and the second image and an optical baseline determined by the gap; and
      determine a final distance to the object based on the first distance augmented by or superseded by the second distance.

2. The stereoscopic imager system of claim 1, wherein the plurality of ranging photosensors are organized in a diagonally staggered arrangement, and the first and second pluralities of imaging photosensors are each organized in a rectangular arrangement.

3. The stereoscopic imager system of claim 2, wherein at least some of the first plurality of imaging photosensors and at least some of the plurality of second imaging photosensors are positioned along the same horizontal line.

4. The stereoscopic imager system of claim 1, wherein the moving component is an electric motor that rotates the sensor array around a center axis.

5. The stereoscopic imager system of claim 1, wherein the moving component is a micro-electrical mechanical system (MEMS) device that reflects light to move the field of view.

6. The stereoscopic imager system of claim 1, wherein the system controller is further configured to determine the final distance to the object by averaging the first and second distances together.

7. The stereoscopic imager system of claim 1, wherein the system controller is further configured to determine the final distance to the object by replacing the first distance with the second distance.

8. A method of distance measurement, comprising:
   moving a field of view of a sensor array including a first array of imaging photosensors and a second array of imaging photosensors spaced apart from each other by a gap;
   measuring a first distance to the object using an array of ranging photosensors;
   capturing a first image of an object in a scene with the first array of imaging photosensors from a first perspective at a first instance of time as the field of view moves;
   capturing a second image of the scene of the object in the scene with the second array of imaging photosensors from a second perspective at a second instance of time as the field of view moves;
   calculating, based on the first image and the second image, a second distance to the object using an optical baseline defined by the gap; and
   determining a final distance to the object based on the first distance augmented by or superseded by the second distance.

9. The method of claim 8, further comprising:
   comparing shared features of the object captured in the first image and the second image; and
   using the results from the comparison to calculate the second distance to the object.

10. The method of claim 8, wherein the sensor array is formed of a two-dimensional array of imaging photosensors, and the first array of imaging photosensors and the second array of imaging photosensors are each a subset of the two-dimensional array of imaging photosensors.

11. The method of claim 8 wherein the ranging photosensor is in a two-dimensional array of ranging photosensors and the first and second arrays of imaging photosensors are located on opposing sides of the array of ranging photosensors.

12. The method of claim 11 wherein array of ranging photosensors is organized in a diagonally staggered arrangement and the first and second arrays of imaging photosensors are organized in a rectangular arrangement.

13. The method of claim 8 wherein the final distance to the object is determined by averaging the first and second distances together.

14. The method of claim 8 wherein the final is determined by replacing the first distance with the second distance.

15. An imaging system comprising:
   an array of light emitters configured to output a plurality of narrowband light rays into a field external to the imaging system;
   an array of ranging photosensors operable to detect photons emitted by the array of light emitters after the photons are reflected from surfaces within the field;
   a first plurality of imaging photosensors positioned at a first side of the array of ranging photosensors and operable to detect ambient light from the field;
   a second plurality of imaging photosensors spaced apart from the first plurality of imaging photosensors by a gap, and positioned along a second side of the array of ranging photosensors opposite the first side, the second plurality of photosensors being operable to detect ambient light from the field;
   wherein the array of ranging photosensors, first plurality of imaging photosensors and second plurality of imaging photosensors all have a shared field of view within the field; and
   a system controller coupled to the array of light emitters, the array of ranging photosensors, and the first and second pluralities of imaging photosensors, and configured to:

collect three-dimensional distance data representing a scene in the shared field of view of the system based on output from the array of ranging photosensors;

capture a first image of the scene with the first plurality of imaging photosensors from a first perspective;

capture a second image of the scene with the second plurality of imaging photosensors from a second perspective;

calculate distances to objects in the scene based on the first image and the second image; and augment the three-dimensional distance data based on output from the array of ranging photosensors with distances to objects in the scene calculated from the first and second images.

16. The imaging system set forth in claim 15 wherein the three-dimensional distance data is used to construct a topographical map of a portion of the field and the light captured by the first and second pluralities of imaging photosensors are used to construct an Red-Green-Blue (RGB) image of the portion of the field that is highly correlated with the topographical map.

17. The imaging system set forth in claim 15 further comprising a moving component operable to rotate the array of light emitters, the array of ranging photosensors and the first and second pluralities of imaging photosensors about a full 360 degree rotation axis of the system.

18. The imaging system set forth in claim 15 wherein the second plurality of imaging photosensors is spaced apart from the first plurality of imaging photosensors by a gap and the system controller is configured to calculate distances to objects in the scene based on the first image and the second image and an optical baseline determined by the gap.

19. The imaging system set forth in claim 15 wherein the three-dimensional distance data based on output from the array of ranging photosensors is augmented by averaging at least some distances in the three-dimensional distance data with distances calculated based on the first and second images.

20. The imaging system set forth in claim 15 wherein the three-dimensional distance data based on output from the array of ranging photosensors is augmented by replacing at least some distances in the three-dimensional distance data with distances calculated based on the first and second images.

* * * * *